(12) United States Patent
Satoh

(10) Patent No.: US 6,870,593 B2
(45) Date of Patent: Mar. 22, 2005

(54) LIQUID CRYSTAL DISPLAY CELL WITH IMPROVED SPACER STRUCTURE

(75) Inventor: Hiroki Satoh, Akita (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 177 days.

(21) Appl. No.: 10/242,604

(22) Filed: Sep. 13, 2002

(65) Prior Publication Data

US 2003/0048403 A1 Mar. 13, 2003

(30) Foreign Application Priority Data

Sep. 13, 2001 (JP) .......................................... 2001-278590

(51) Int. Cl.⁷ .............................................. G02F 1/1339

(52) U.S. Cl. ....................................................... 349/155

(58) Field of Search .......................................... 349/155

(56) References Cited

U.S. PATENT DOCUMENTS 6,671,025 B1 * 12/2003 Ikeda et al. .................. 349/156
2001/0026347 A1 * 10/2001 Sawasaki et al. ........... 349/156

FOREIGN PATENT DOCUMENTS

| JP | A 10-48640 | 2/1998 |
| JP | A 2000-2877 | 1/2000 |
| JP | A 2000-310784 | 11/2000 |
| JP | A 2000-338503 | 12/2000 |

* cited by examiner

Primary Examiner—Tarifur R. Chowdhury
Assistant Examiner—P. R. Akkapeddi
(74) Attorney, Agent, or Firm—Young & Thompson

(57) ABSTRACT

A liquid crystal display cell includes: a first substrate; a second substrate; a liquid crystal layer interposed between the first and second substrates; and a spacer structure on the second substrate. The spacer structure further includes: at least a first type spacer having a first height; and at least a second type spacer having a second height which is smaller than the first height.

22 Claims, 26 Drawing Sheets

LIQUID CRYSTAL DISPLAY CELL WITH IMPROVED SPACER STRUCTURE

BACKGROUND OF THE INVENTION

1. Field of the Invention

The present invention relates to a liquid crystal display, and more particularly to a color filter substrate with an improved spacer structure for a liquid crystal display.

All of patents, patent applications, patent publications, scientific articles and the like, which will hereinafter be cited or identified in the present application, will, hereby, be incorporated by references ill their entirety in order to describe more fully the state of the art, to which the present invention pertains.

2. Description of the Related Art

A conventional structure of a liquid crystal display with a color filter substrate including column-shaped spacers will be described with reference to the drawings. FIG. 1A is a fragmentary schematic plan view of a conventional structure of a color filter substrate included in a conventional liquid crystal display. FIG. 1B is a fragmentary schematic cross sectional elevation view, taken along an X–X' line in FIG. 1A, illustrative of the conventional structure of the conventional liquid crystal display.

The liquid crystal display includes a color filter substrate 111 and a thin film transistor substrate 131 as well as a liquid crystal layer 113 filling in an inter-space between the color filter substrate 111 and the thin film transistor substrate 131.

The thin film transistor substrate 131 has a normal structure which includes a glass substrate, an insulating film, a matrix array of thin film transistors, interconnections and an orientation film which are not illustrated.

The color filter substrate 111 has a matrix array of pixels, each of which includes a set of primary-three-color filters 123, 124 and 125 which extend in parallel to each other and in a horizontal direction perpendicular to the X—X' line in FIG. 1A. The each pixel is represented by a broken line in FIG. 1A and has a rectangle shape in plan view which has a longitudinal direction along the X—X' line in FIG. 1A.

With reference to FIG. 1B, the color filter substrate 111 includes a glass substrate 101, a black matrix layer 102, color filter layers 123, 124 and 125, a common electrode layer 106, a column-shaped spacer 143, and an orientation film 107. The black matrix layer 102 extends over the glass substrate 101. The color filter layers 123, 124 and 125 extend over the black matrix layer 102 in the horizontal direction perpendicular to the X—X' line. The color filter layers 123, 124 and 125 are aligned in the direction along the X—X' line at a constant pitch and a constant gap, so that parts of the top surface of the black matrix layer 102 are exposed. Each of the color filter layers 123, 124 and 125 has a ridge shape in sectioned view, so that each of the color filter layers 123, 124 and 125 has a top plat surface and two sloped side-walls. The common electrode layer 106 extends on the top plat surface and the two sloped side-walls of the color filter layers 123, 124 and 125 and also on the exposed surface of the black matrix layer 102. The common electrode layer 106 may typically comprise an indium tin oxide film.

The column-shaped spacer 143 is provided in a gap between adjacent two of the pixels. The column-shaped spacer 143 is provided on the common electrode layer 106 over the top flat surface of the color filter layer 123. The orientation film 107 extends on the top surface and the side walls of the column-shaped spacer 143 as well as on the common electrode layer 106. The orientation film 107 is exposed to the liquid crystal layer 113. The orientation film 107 over the top surface of the column-shaped spacer 143 is in contact with the thin film transistor substrate 131. As described above, the column-shaped spacer 143 is provided in the gap between adjacent two of the pixels. Namely, the plural column-shaped spacers 143 are provided over the color filter substrate 111, so that the column-shaped spacers 143 form the inter-space defined between the color filter substrate ill and the thin film transistor substrate 131, so as to allow the liquid crystal layer 113 to fill the inter-space.

Another conventional structure of the liquid crystal display with the color filter substrate including column-shaped spacers will be described with reference to the drawings. FIG. 2A is a fragmentary schematic plan view of another conventional structure of the color filter substrate included in the conventional liquid crystal display. FIG. 2B is a fragmentary schematic cross sectional elevation view, taken along an X—X' line in FIG. 2A, illustrative of the conventional structure of the conventional liquid crystal display.

A difference of this other conventional structure of FIGS. 2A and 2B from the above-described conventional structure of FIGS. 1A and 1B is only in that not only the column-shaped spacer 143 is provided over the top surface of the color filter layer 123 but further column-shaped spacers 144 and 145 are also provided over the top surfaces of the color filter layers 124 and 125. Namely, in accordance with the conventional structure of FIGS. 2A and 2B, a set of the three column-shaped spacers 143, 144 and 145 is provided in the gap between the adjacent two of the pixels.

The above-described conventional structure of FIGS. 1A and 1B has the following problem with temperature variation. FIG. 3A is a fragmentary schematic cross sectional elevation view illustrative of the conventional structure of the liquid crystal display shown in FIGS. 1A and 1B, wherein the display is placed at a normal temperature of, for example, 20° C. FIG. 3B is a fragmentary schematic cross sectional elevation view illustrative of the conventional structure of the liquid crystal display shown in FIGS. 1A and 1B, wherein the display is placed at a high temperature of, for example, 60° C.

The variation in temperature causes a variation in cell gap of the display. The cell gap is defined to be a distance in vertical direction between the bottom surface of the thin film transistor substrate 131 and the top surface of the orientation film 107 in the gap between the adjacent two of the color filter layers 123, 124 and 125. Namely, the cell gap corresponds to a maximum gap in vertical direction of the inter-space between the thin film transistor substrate 131 and the color filter substrate 111.

As shown in FIG. 3A, if the display is placed in the normal temperature environment, for example, at 20° C., a cell gap "T1" is given by a spacer 103 which is defined between the top surface of the orientation film 107 over the top surface of the column-shaped spacer 143 and the top surface of the orientation film 107 in the gap between the adjacent two of the color filter layers 123, 124 and 125. Namely, the height of the spacer 103 corresponds to a sum of a height of the column-shaped spacer 143 and a height of the color filter layer 123. Accordingly, in the normal temperature environment, the cell gap "T1" is given by the total height of the column-shaped spacer 143 and the color filter layer 123.

As shown in FIG. 3B, if the display is placed in the high temperature environment, for example, at 60° C., a cell gap "T2" is formed which is larger than the cell gap "T1", because the top surface of the orientation film 107 over the top surface of the column-shaped spacer 143 is distanced from the bottom surface of the thin film transistor substrate 131. Namely, the temperature increase causes an expansion of the liquid crystal layer 113. This expansion of the liquid crystal increases the cell gap and distances the top surface of the orientation film 107 over the top surface of the column-shaped spacer 143 from the bottom surface of the thin film transistor substrate 131, whereby the thin film transistor substrate 131 is floated by the expanded liquid crystal layer 113 from the column-shaped spacer 143. Therefore, the cell gap "T2" is unstable and variable.

In order to avoid the last-described problem, it was proposed that in the normal temperature environment, the column-shaped spacer 143 be compressed in the vertical direction, so that in the high temperature environment, the column-shaped spacer 143 is allowed to be free of the vertical compression and returned to the original shape by the expansion of the liquid crystal layer 113, whereby the compression-free column-shaped spacer 143, however, still supports the thin film transistor substrate 131. The description of this alternative proposal will be made in detail with reference to the drawings.

FIG. 4A is a fragmentary schematic cross sectional elevation view illustrative of the conventional structure of the liquid crystal display shown in FIGS. 1A and 1B, wherein the display is placed at the normal temperature of, for example, 20° C., and the column-shaped spacer is compressed in the vertical direction. FIG. 4B is a fragmentary schematic cross sectional elevation view illustrative of the conventional structure of the liquid crystal display shown in FIGS. 1A and 1B, wherein the display is placed at a high temperature of, for example, 60° C., and the column-shaped spacer is free from any vertical compression.

In the normal temperature environment, as shown in FIG. 4A, the column-shaped spacer 143 is compressed in the vertical direction, so that a smaller cell gap "t1" is formed, which is smaller than the above cell gap "T1" shown in FIG. 3A. The column-shaped spacer 143 has an elasticity.

If the display is placed into the high temperature environment as shown in FIG. 4B, then the liquid crystal layer 113 is expanded to press the color filter substrate 111 and the thin film transistor substrate 131 outwardly, so that the vertical compression to the column-shaped spacer 143 is reduced, and thus a larger cell gap "t2" is formed which is larger than the above cell gap "t1" in the normal temperature environment. However, in the high temperature environment as shown in FIG. 4B, the compression-reduced column-shaped spacer 143 sill supports the thin film transistor substrate 131, whereby the thin film transistor substrate 131 is securely and stably supported by the compression-reduced column-shaped spacer 143. The cell gap "t2" is also stable and not variable. This technique is to utilize the elasticity of the column-shaped spacer 143.

FIG. 5A is a fragmentary schematic cross sectional elevation view illustrative of the conventional structure of the liquid crystal display shown in FIGS. 1A and 1B, wherein the display is placed at the normal temperature of, for example, 20° C. FIG. 5B is a fragmentary schematic cross sectional elevation view illustrative of the conventional structure of the liquid crystal display shown in FIGS. 1A and 1B, wherein the display is placed at a low temperature of, for example, −20° C.

As shown in FIG. 5A, if the display is placed in the normal temperature environment, for example, at 20° C., a cell gap "L1" is given by the spacer which is defined between the top surface of the orientation film 107 over the top surface of the column-shaped spacer 143 and the top surface of the orientation film 107 in the gap between the adjacent two of the color filter layers 123, 124 and 125. The column-shaped spacer 143 is free of any substantive vertical compression. Namely, the height of the spacer 103 corresponds to a sum of the height of the column-shaped spacer 143 and the height of the color filter layer 123. Accordingly, in the normal temperature environment, the cell gap "L1" is given by the total height of the compression-free column-shaped spacer 143 and the color filter layer 123.

As shown in FIG. 5B, if the display is placed in the low temperature environment, for example, at −20° C., then a cell gap "L2" is formed which is smaller than the cell gap "L1", because the liquid crystal layer 113 is contracted and reduced in volume and thus the column-shaped spacer 143 is thus compressed in the vertical direction. The column-shaped spacer 143 is provided for the gap between the adjacent two of the pixels. Since the number of the column-shaped spacer 143 is small, then the total elastic force of the plural column-shaped spacers 143 is still smaller than the contracting force of the liquid crystal layer 113.

FIG. 6A is a fragmentary schematic cross sectional elevation view illustrative of the conventional structure of the liquid crystal display shown in FIGS. 2A and 2B, wherein the display is placed at the normal temperature of, for example, 20° C. FIG. 6B is a fragmentary schematic cross sectional elevation view illustrative of the conventional structure of the liquid crystal display shown in FIGS. 2A and 2B, wherein the display is placed at a low temperature of, for example, −20° C.

As shown in FIG. 6A, if the display is placed in the normal temperature environment, for example, at 20° C., a cell gap "L1" is given by the spacer which is defined between the top surface of the orientation film 107 over the top surface of the column-shaped spacers 143, 144 and 145 and the top surface of the orientation film 107 in the gap between the adjacent two of the color filter layers 123, 124 and 125. The column-shaped spacers 143, 144 and 145 are free of any substantive vertical compression. Namely, the height of the spacer 103 corresponds to a sum of the height of each of the column-shaped spacers 143, 144 and 145 and the height of each of the color filter layers 123, 124 and 125. Accordingly, in the normal temperature environment, the cell gap "L1" is given by the total height of each of the compression-free column-shaped spacers 143, 144 and 145 and each of the color filter layers 123, 124 and 125.

As shown in FIG. 6B, if the display is placed in the low temperature environment, for example, at −20° C., then a cell gap "L2" is formed which is nearly equal to the cell gap "L1", because the liquid crystal layer 113 has a contracting force but not reduced in volume and thus the column-shaped spacers 143, 144 and 145 are not compressed in the vertical direction. The column-shaped spacers 143, 144 and 145 are provided for the gap between the adjacent two of the pixels. Since the number of the column-shaped spacers 143, 144 and 145 is large, then the total elastic force of the plural column-shaped spacers 143, 144 and 145 is larger than the contracting force of the liquid crystal layer 113. For this reason, the cell gap is not varied substantially. However, the liquid crystal layer 113 causes an evaporation of chemically unstable low molecular materials therein, whereby undesired bubbles or foam are formed in the liquid crystal layer 113. These bubbles or foam cause defects in the display device. Consequently, the small number of the column-shaped spacers is preferable for avoiding the undesired formation of the bubbles or foam in the liquid crystal layer 113.

The following descriptions will focus on how the status of the display device is changed upon application of an external load and after released from the load. FIG. 7A is a fragmentary schematic cross sectional elevation view of the liquid crystal display device shown in FIGS. 1A and 1B, prior to any application of external load. FIG. 7B is a fragmentary schematic cross sectional elevation view of the liquid crystal display device shown in FIGS. 1A and 1B, upon application of an external load in the vertical direction to the surface of the thin film transistor substrate. FIG. 7C is a fragmentary schematic cross sectional elevation view of the liquid crystal display device shown in FIGS. 1A and 1B, after released from the applied external load.

As shown in FIG. 7A, the liquid crystal display device before application of any external load is placed in the same state as that shown in FIGS. 1A and 1B, wherein the column-shaped spacer 143 is free of any compression, and the device has the originally designed cell gap "L1".

As shown in FIG. 7B, the liquid crystal display device is applied with the external load in the direction vertical to the surface of the thin film transistor substrate 111, so that the column-shaped spacer 143 is compressed and largely deformed, and the device has a reduced cell gap "L2" which is smaller than the originally designed cell gap "L1".

As shown in FIG. 7C, even after the liquid crystal display device is released from the external load, the column-shaped spacer 143 still remains in the deformed or compressed state, but not returned to the original shape, and thus the device remains having the reduced cell gap "L2".

FIG. 8A is a fragmentary schematic cross sectional elevation view of the liquid crystal display device shown in FIGS. 2A and 2B, prior to any application of external load. FIG. 8B is a fragmentary schematic cross sectional elevation view of the liquid crystal display device shown in FIGS. 2A and 2B, upon application of an external load in the vertical direction to the surface of the thin film transistor substrate. FIG. 8C is a fragmentary schematic cross sectional elevation view of the liquid crystal display device shown in FIGS. 2A and 2B, after released from the applied external load. As a result, the cell gap variation is caused, and the display defect may be caused.

As shown in FIG. 8A, the liquid crystal display device before application of any external load is placed in the same state as that shown in FIGS. 2A and 2B, wherein the column-shaped spacers 143, 144 and 145 are free of any compression, and the device has the originally designed cell gap "L1".

As shown in FIG. 8B, the liquid crystal display device is applied with the external load in the direction vertical to the surface of the thin film transistor substrate 111, so that the column-shaped spacers 143, 144 and 145 are compressed and slightly deformed, and the device has a reduced cell gap "L2" which is smaller than the originally designed cell gap "L1".

As shown in FIG. 8C, after the liquid crystal display device is released from the external load, the column-shaped spacers 143, 144 and 145 become free from the deformed or compressed state, and are returned to the original shape, so that the device has again the originally designed cell gap "L1". As a result, no cell gap variation is caused, nor display defect may be caused.

Consequently, increasing the density or the number of the column-shaped spacers may increase the mechanical resistivity to the externally applied load, but also allows undesired formation of bubbles or foam in the liquid crystal layer upon the temperature drop.

In the above circumstances, the development of a novel liquid crystal display with an improved spacer structure free from the above problems is desirable.

SUMMARY OF THE INVENTION

Accordingly, it is an object of the present invention to provide a novel liquid crystal display with an improved spacer structure free from the above problems.

The present invention provides a liquid crystal display cell including: a first substrate; a second substrate; a liquid crystal layer interposed between the first and second substrates; and a spacer structure on the second substrate. The spacer structure further includes: at least a first type spacer having a first height; and at least a second type spacer having a second height which is smaller than the first height.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1A:
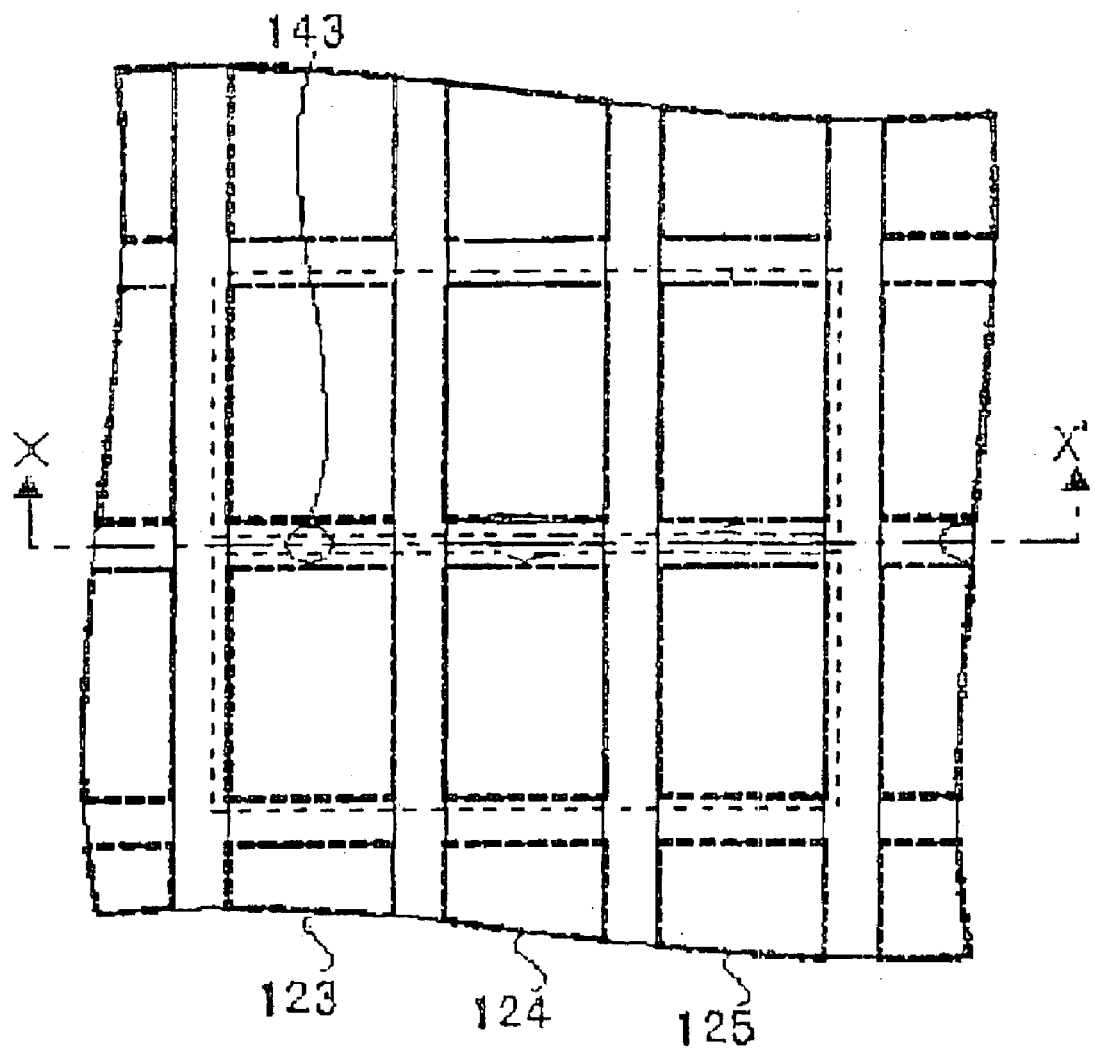
FIG. 1A is a fragmentary schematic plan view of a conventional structure of a color filter substrate included in a conventional liquid crystal display.
Figure 1B:
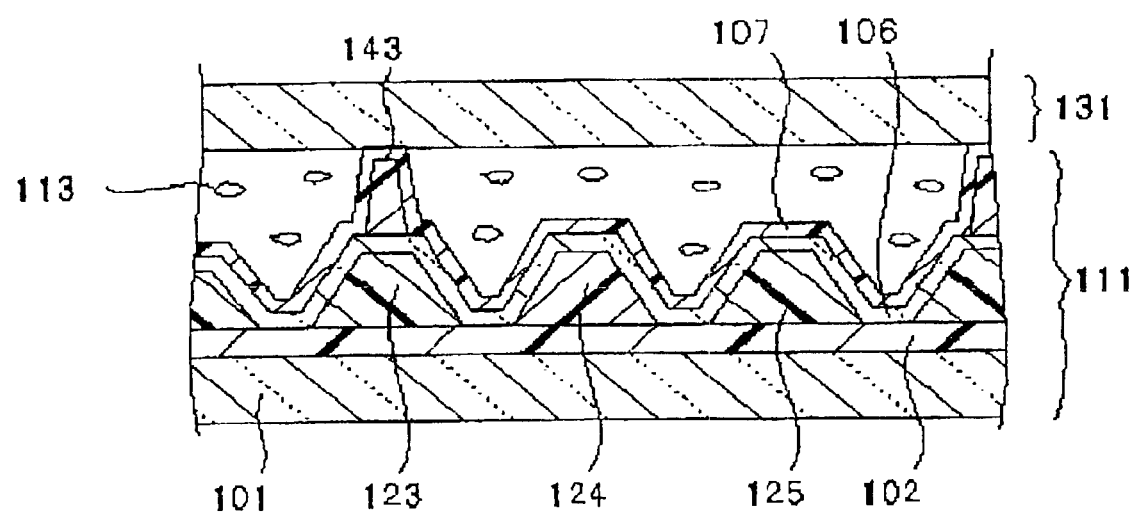
FIG. 1B is a fragmentary schematic cross sectional elevation view, taken along an X—X' line in FIG. 1A, illustrative of the conventional structure of the conventional liquid crystal display.
Figure 2A:
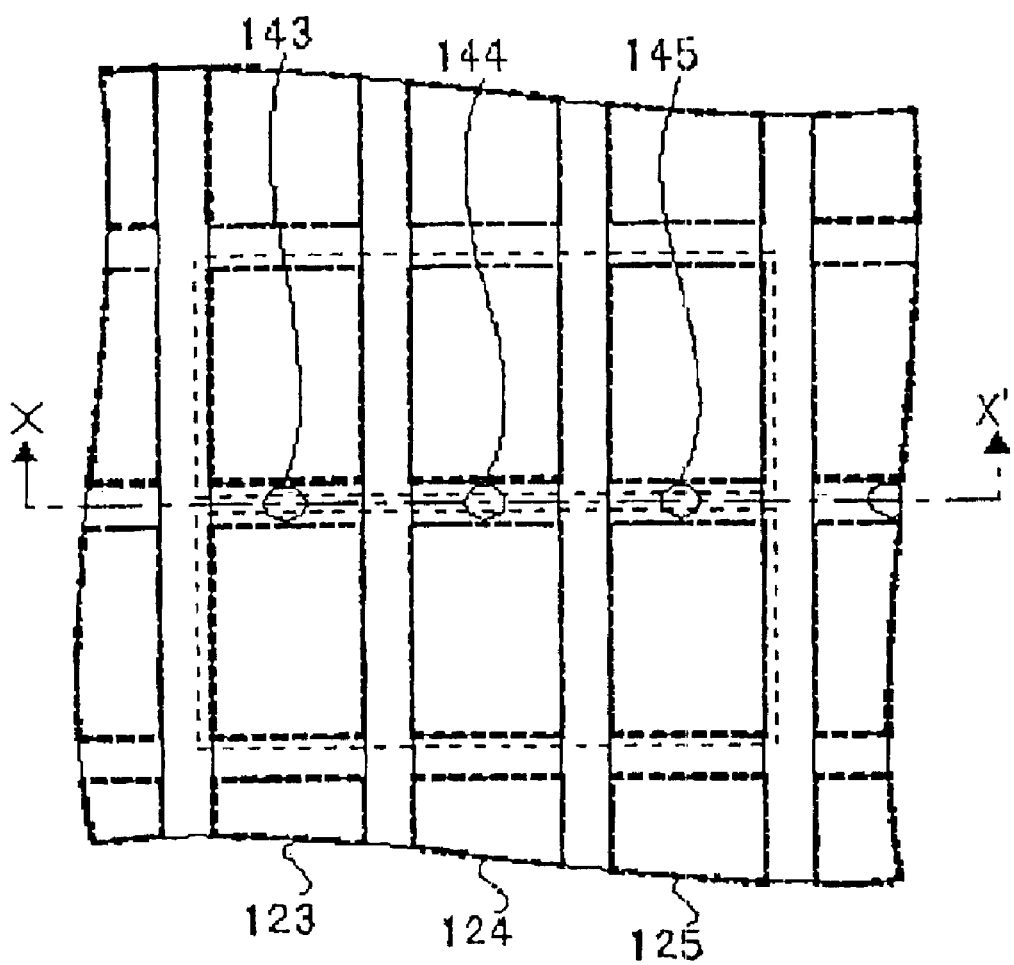
FIG. 2A is a fragmentary schematic plan view of another conventional structure of the color filter substrate included in the conventional liquid crystal display.
Figure 2B:
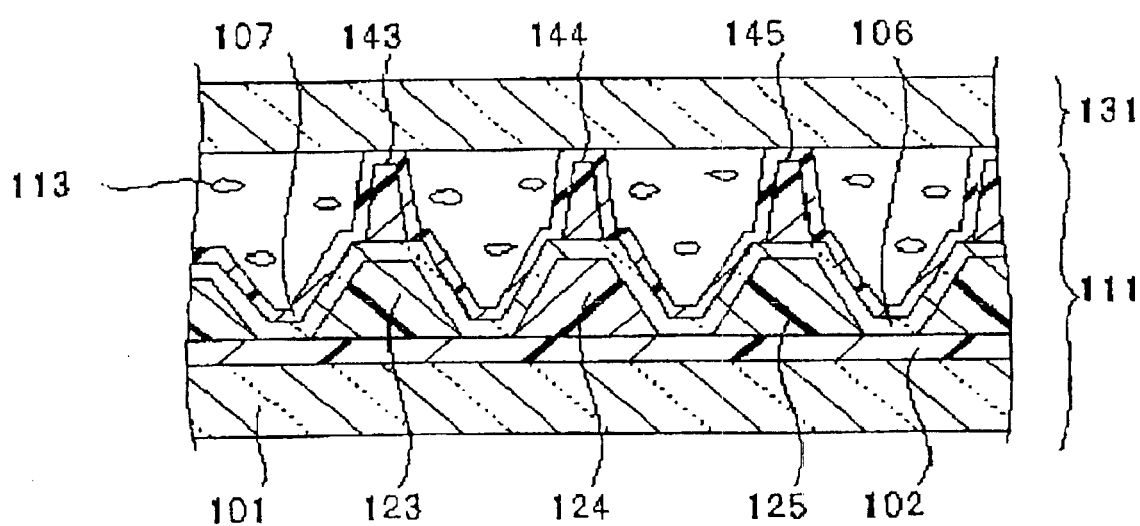
FIG. 2B is a fragmentary schematic cross sectional elevation view, taken along an X—X' line in FIG. 2A, illustrative of the conventional structure of the conventional liquid crystal display.
Figure 3A:
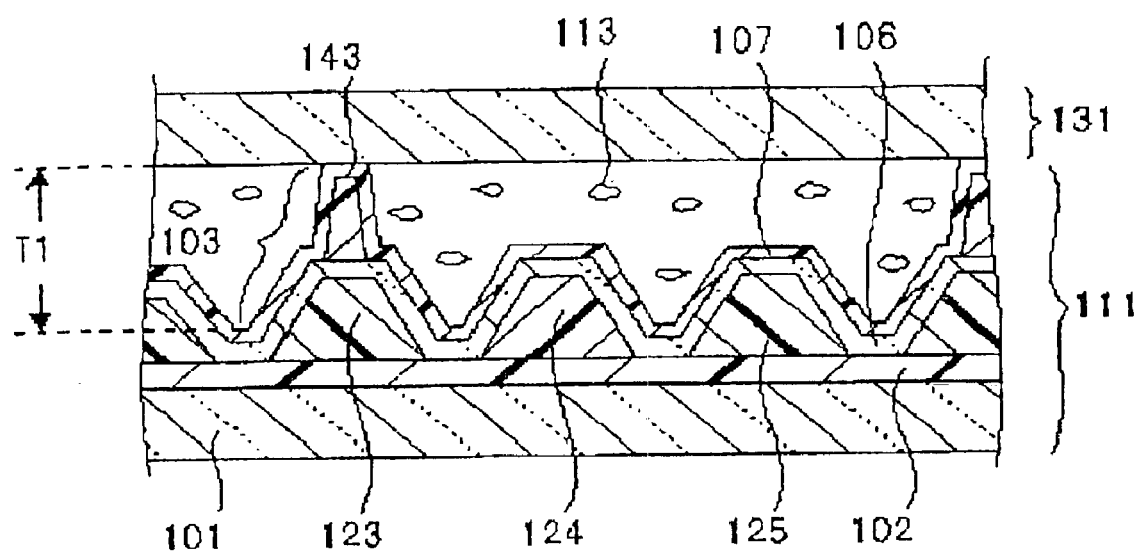
FIG. 3A is a fragmentary schematic cross sectional elevation view illustrative of the conventional structure of the liquid crystal display shown in FIGS. 1A and 1B, wherein the display is placed at a normal temperature of, for example, 20° C.
Figure 3B:
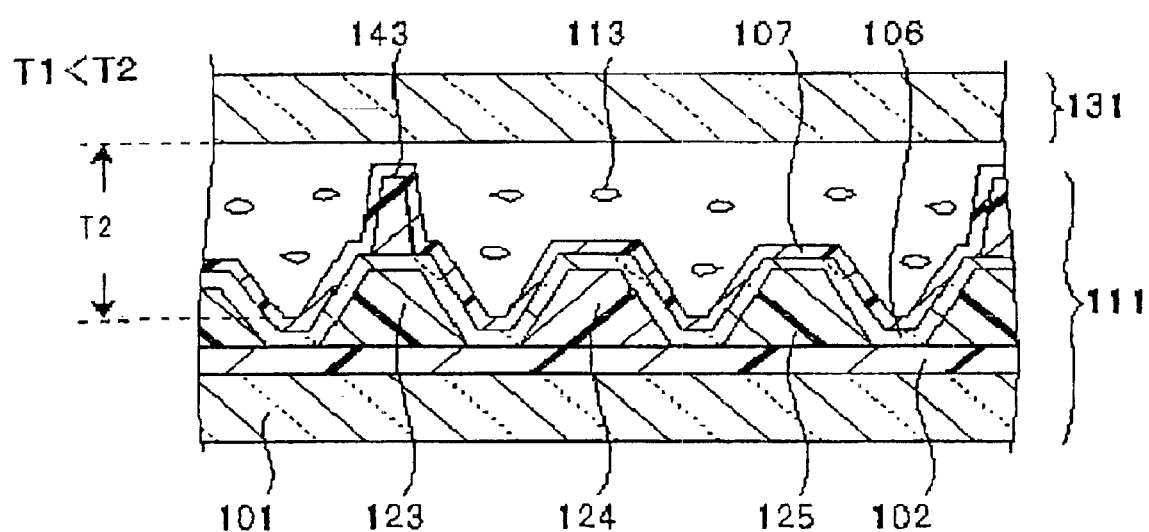
FIG. 3B is a fragmentary schematic cross sectional elevation view illustrative of the conventional structure of the liquid crystal display shown in FIGS. 1A and 1B, wherein the display is placed at a high temperature of, for example, 60° C.
Figure 4A:
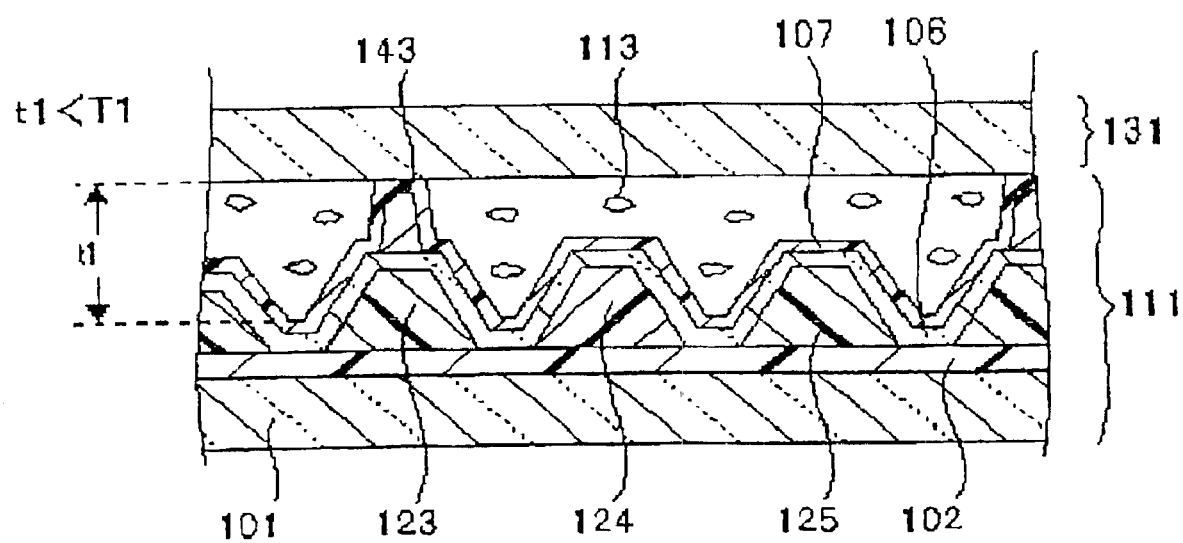
FIG. 4A is a fragmentary schematic cross sectional elevation view illustrative of the conventional structure of the liquid crystal display shown in FIGS. 1A and 1B, wherein the display is placed at the normal temperature of, for example, 20° C., and the column-shaped spacer is compressed in the vertical direction.
Figure 4B:
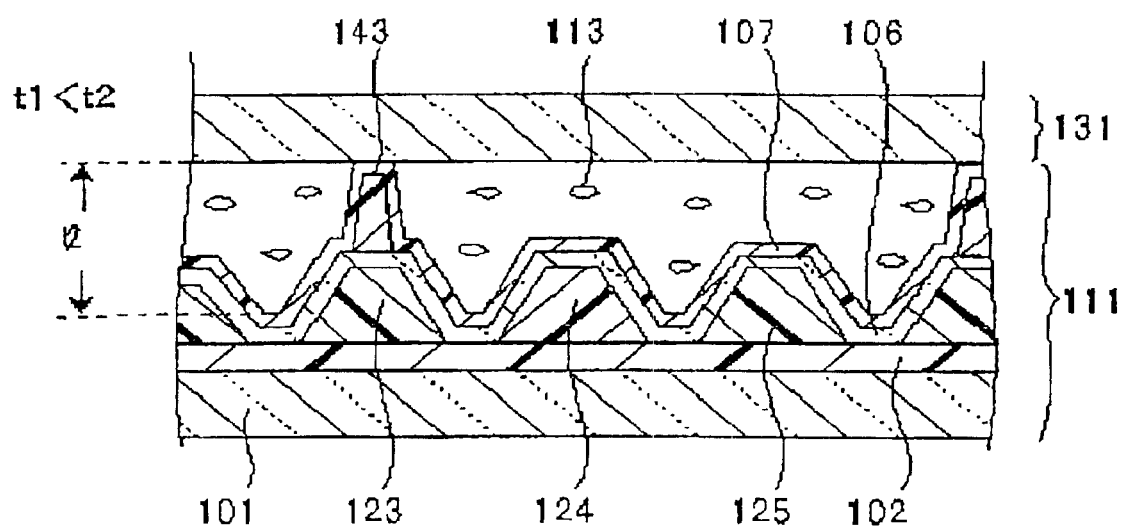
FIG. 4B is a fragmentary schematic cross sectional elevation view illustrative of the conventional structure of the liquid crystal display shown in FIGS. 1A and 1B, wherein the display is placed at a high temperature of, for example, 60° C., and the column-shaped spacer is free from any vertical compression.
Figure 5A:
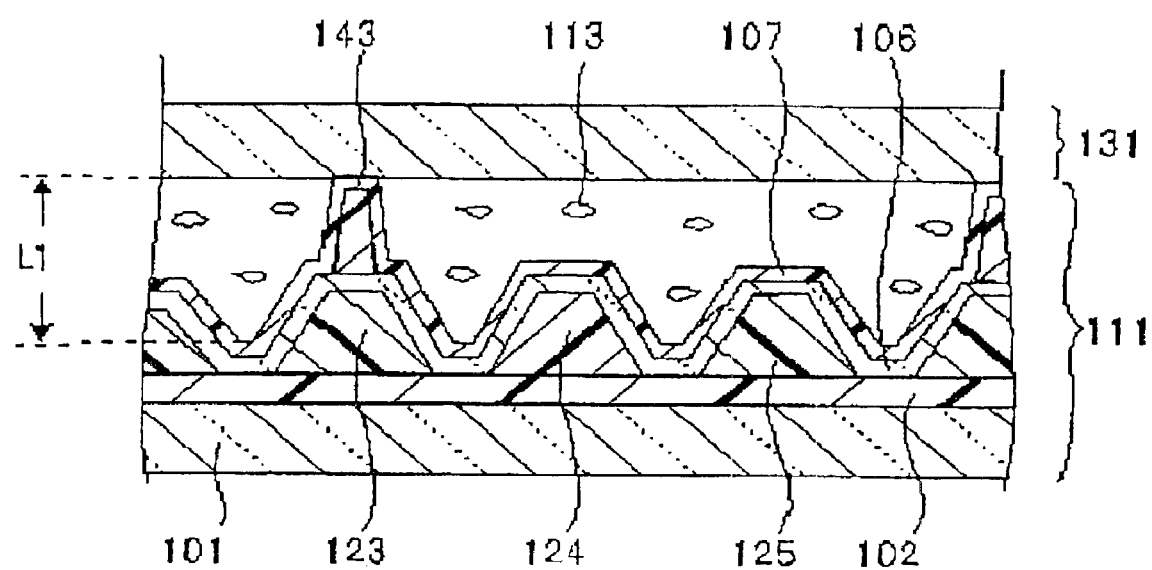
FIG. 5A is a fragmentary schematic cross sectional elevation view illustrative of the conventional structure of the liquid crystal display shown in FIGS. 1A and 1B, wherein the display is placed at the normal temperature of, for example, 20° C.
Figure 5B:
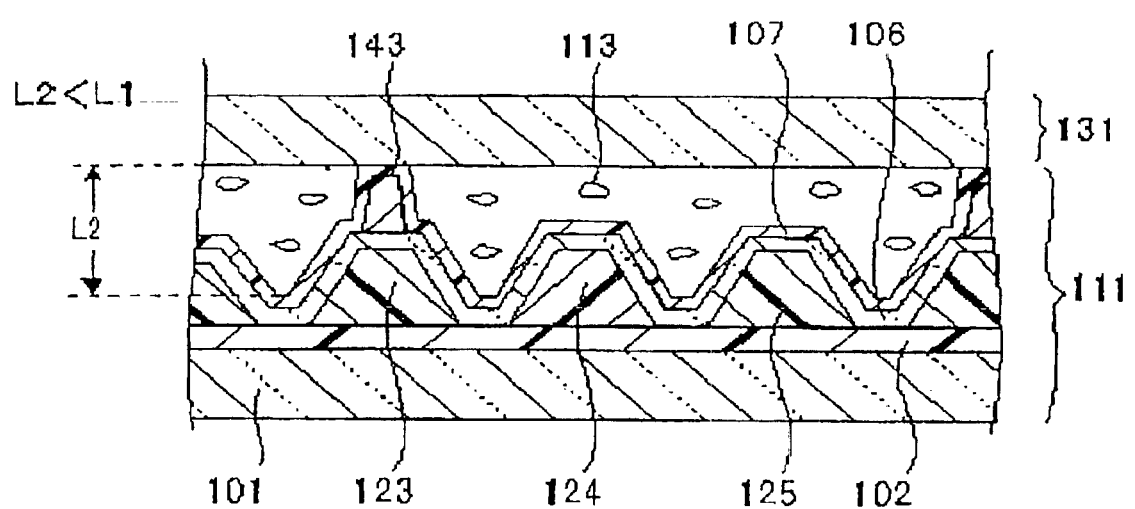
FIG. 5B is a fragmentary schematic cross sectional elevation view illustrative of the conventional structure of the liquid crystal display shown in FIGS. 1A and 1B, wherein the display is placed at a low temperature of, for example, −20° C.
Figure 6A:
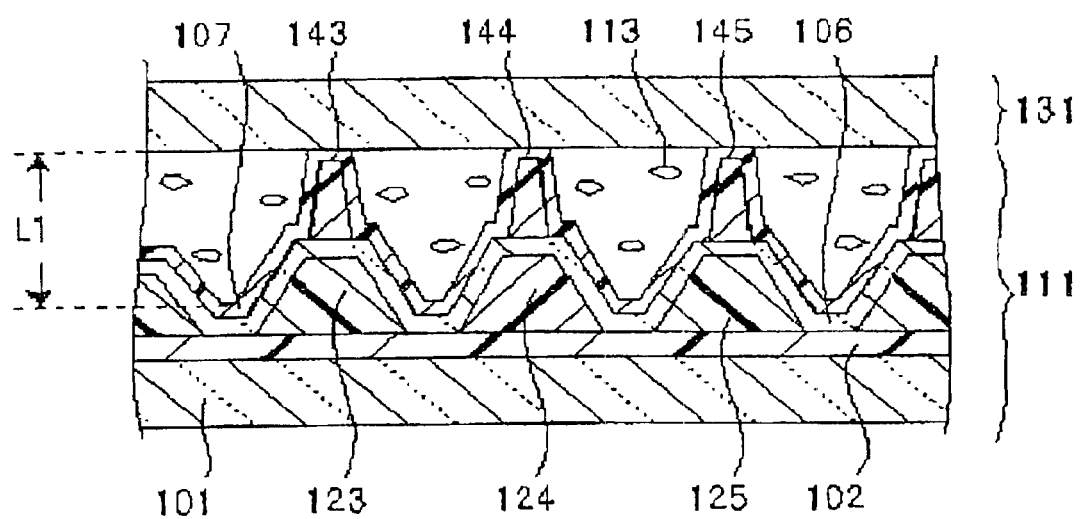
FIG. 6A is a fragmentary schematic cross sectional elevation view illustrative of the conventional structure of the liquid crystal display shown in FIGS. 2A and 2B, wherein the display is placed at the normal temperature of, for example, 20° C.
Figure 6B:
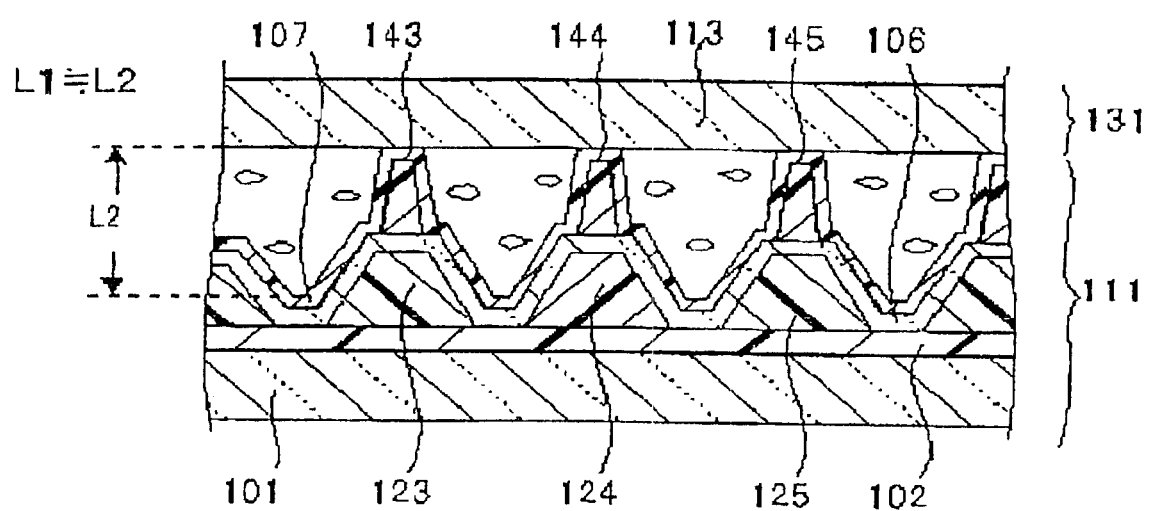
FIG. 6B is a fragmentary schematic cross sectional elevation view illustrative of the conventional structure of the liquid crystal display shown in FIGS. 2A and 2B, wherein the display is placed at a low temperature of, for example, −20° C.
Figure 7A:
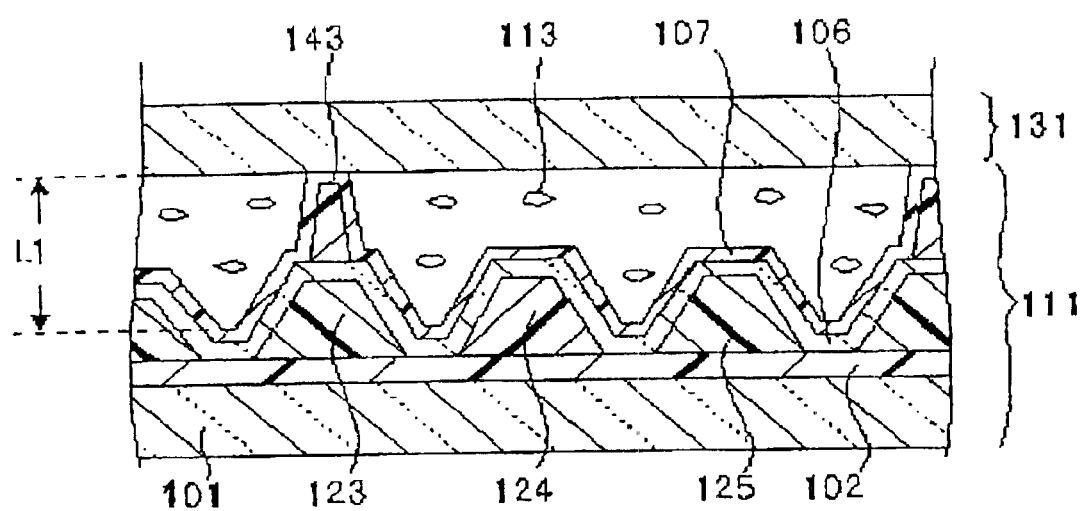
FIG. 7A is a fragmentary schematic cross sectional elevation view of the liquid crystal display device shown in FIGS. 1A and 1B, prior to any application of external load.
Figure 7B:
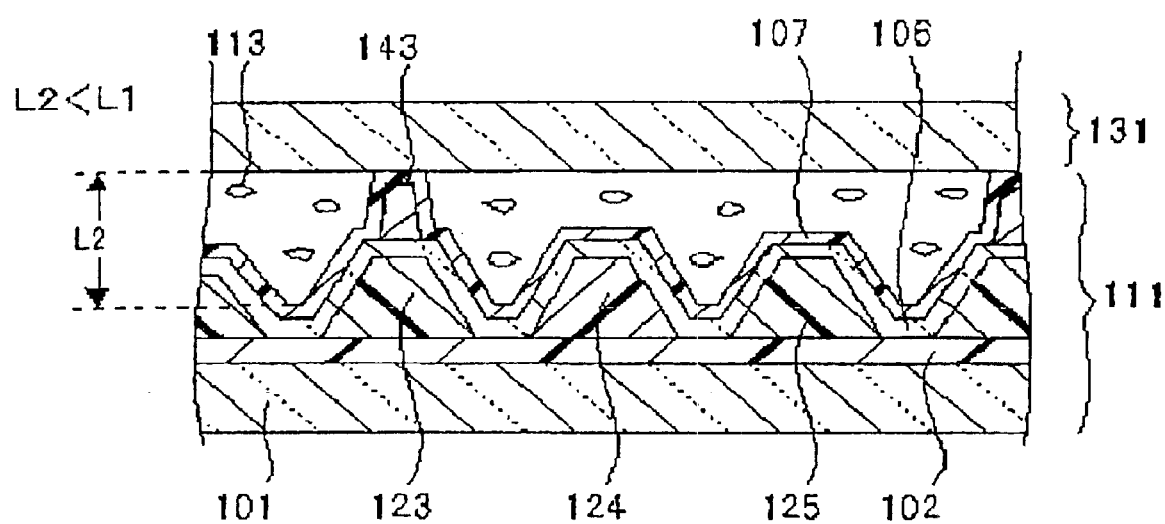
FIG. 7B is a fragmentary schematic cross sectional elevation view of the liquid crystal display device shown in FIGS. 1A and 1B, upon application of an external load in the vertical direction to the surface of the thin film transistor substrate.
Figure 7C:
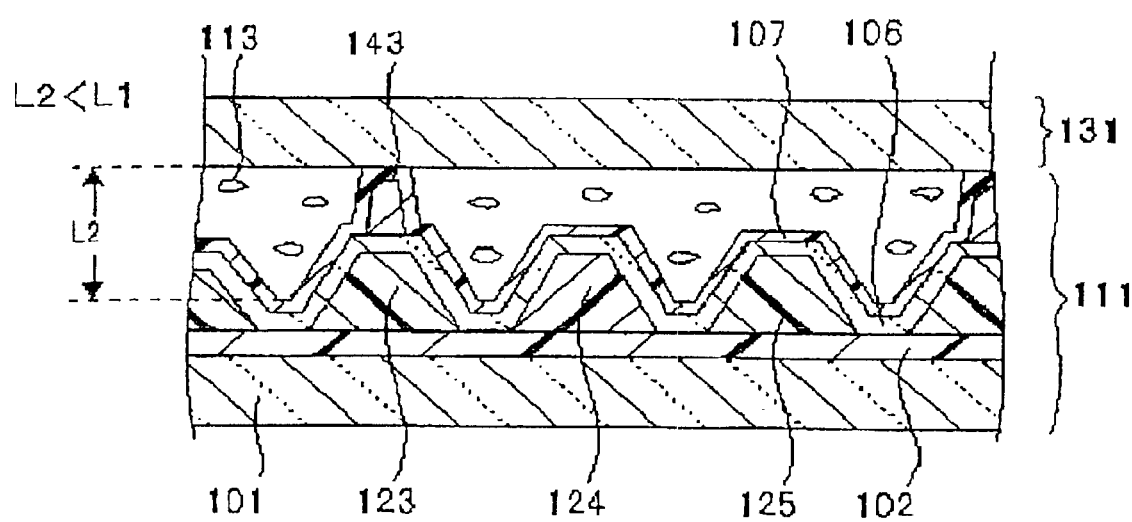
FIG. 7C is a fragmentary schematic cross sectional elevation view of the liquid crystal display device shown in FIGS. 1A and 1B, after released from the applied external load.
Figure 8A:
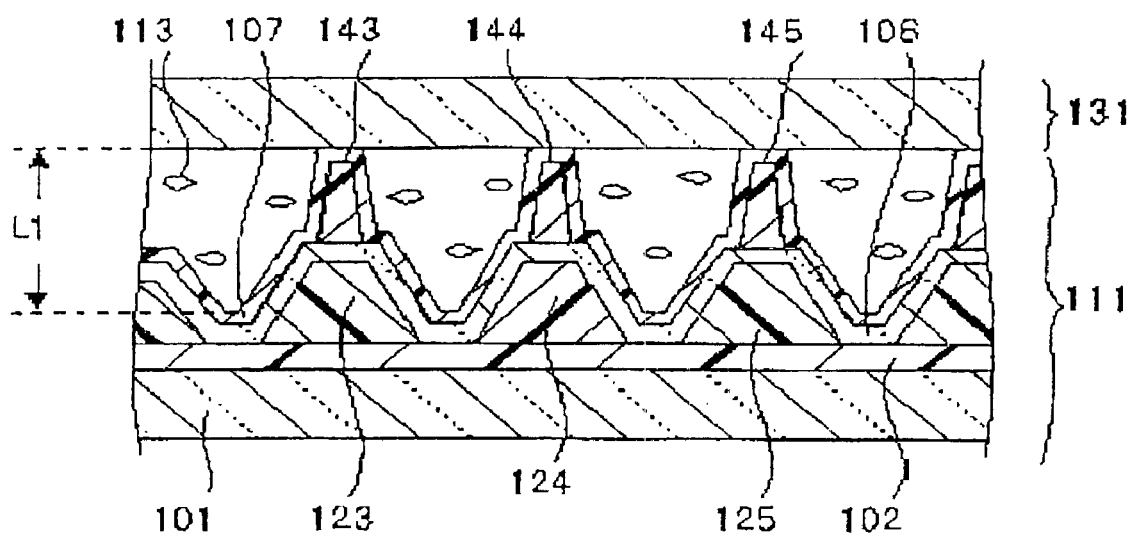
FIG. 8A is a fragmentary schematic cross sectional elevation view of the liquid crystal display device shown in FIGS. 2A and 2B, prior to any application of external load.
Figure 8B:
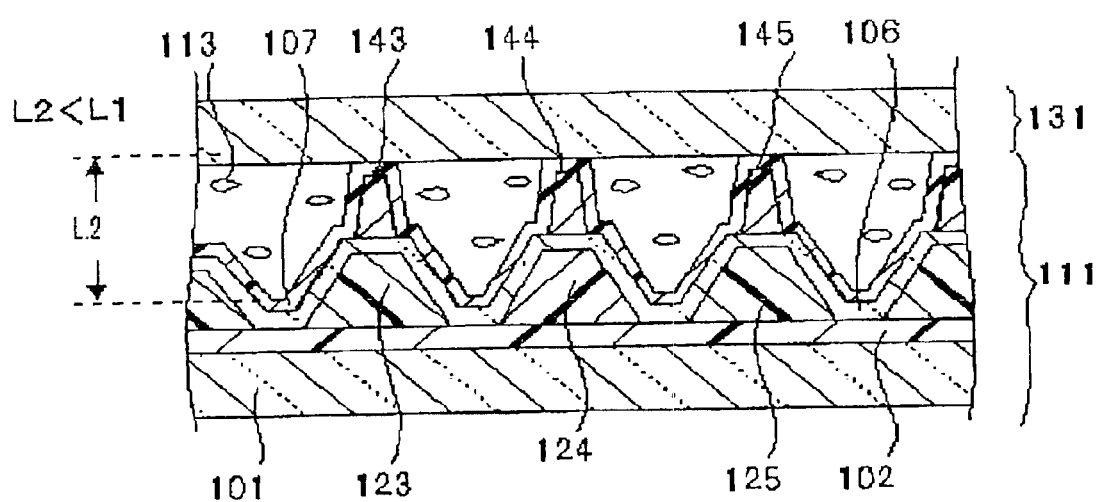
FIG. 8B is a fragmentary schematic cross sectional elevation view of the liquid crystal display device shown in FIGS. 2A and 2B, upon application of an external load in the vertical direction to the surface of the thin film transistor substrate.
Figure 8C:
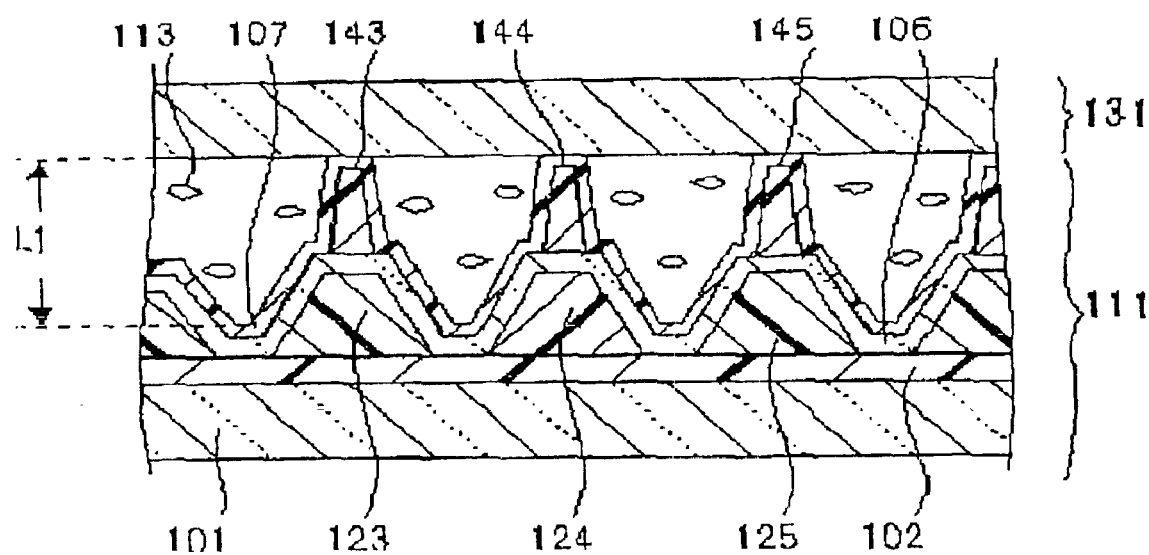
FIG. 8C is a fragmentary schematic cross sectional elevation view of the liquid crystal display device shown in FIGS. 2A and 2B, after released from the applied external load.

A primary aspect of the present invention is a liquid crystal display cell including: a first substrate; a second substrate; a liquid crystal layer interposed between the first and second substrates; and a spacer structure on the second substrate. The spacer structure further includes: at least a first type spacer having a first height; and at least a second type spacer having a second height which is smaller than the first height.

It is preferable that the first height provides an original cell gap, and a difference between the first and second heights is smaller than an elastic deformation limit of the first spacer, provided that the elastic deformation limit is a transitional compressive deformation amount, over which a compressive deformation is a plastic deformation and under which the compressive deformation is an elastic deformation.

It is also preferable that the first height provides an original cell gap, and the second height is larger than a subtraction of an elastic deformation limit of the first spacer from the first height, provided that the elastic deformation limit is a transitional compressive deformation amount, over which a compressive deformation is a plastic deformation and under which the compressive deformation is an elastic deformation.

It is also preferable that the first type spacer comprises a first color filter layer over the second substrate, and a first column-shaped spacer over the first color filter layer, and the second type spacer comprises a second color filter layer over the second substrate, and a second column-shaped spacer over the second color filter layer. In one example, the first and second color filter layers may have the same thickness or height, while the first column-shaped spacer may be larger in height than the second column-shaped spacer. In another example, the first and second column-shaped spacers may have the same height, while the first color filter layer may be larger in thickness or height than the second color filter layer.

It is preferable that the spacer structure further includes: at least a third type spacer having a third height which is smaller than the second height. Preferably, the third type spacer may comprise a third color filter layer over the second substrate, and a third column-shaped spacer over the third color filter layer. In one example, the first, second and third color filter layers may have the same thickness or height, while the first column-shaped spacer may be larger in height than the second column-shaped spacer, and the second column-shaped spacer may be larger in height than the third column-shaped spacer. In another example, the first, second and third column-shaped spacers may have the same height, while the first color filter layer may be larger in height than the second color filter layer, and the second color filter layer may be larger in thickness or height than the third color filter layer.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

Figure 9A:
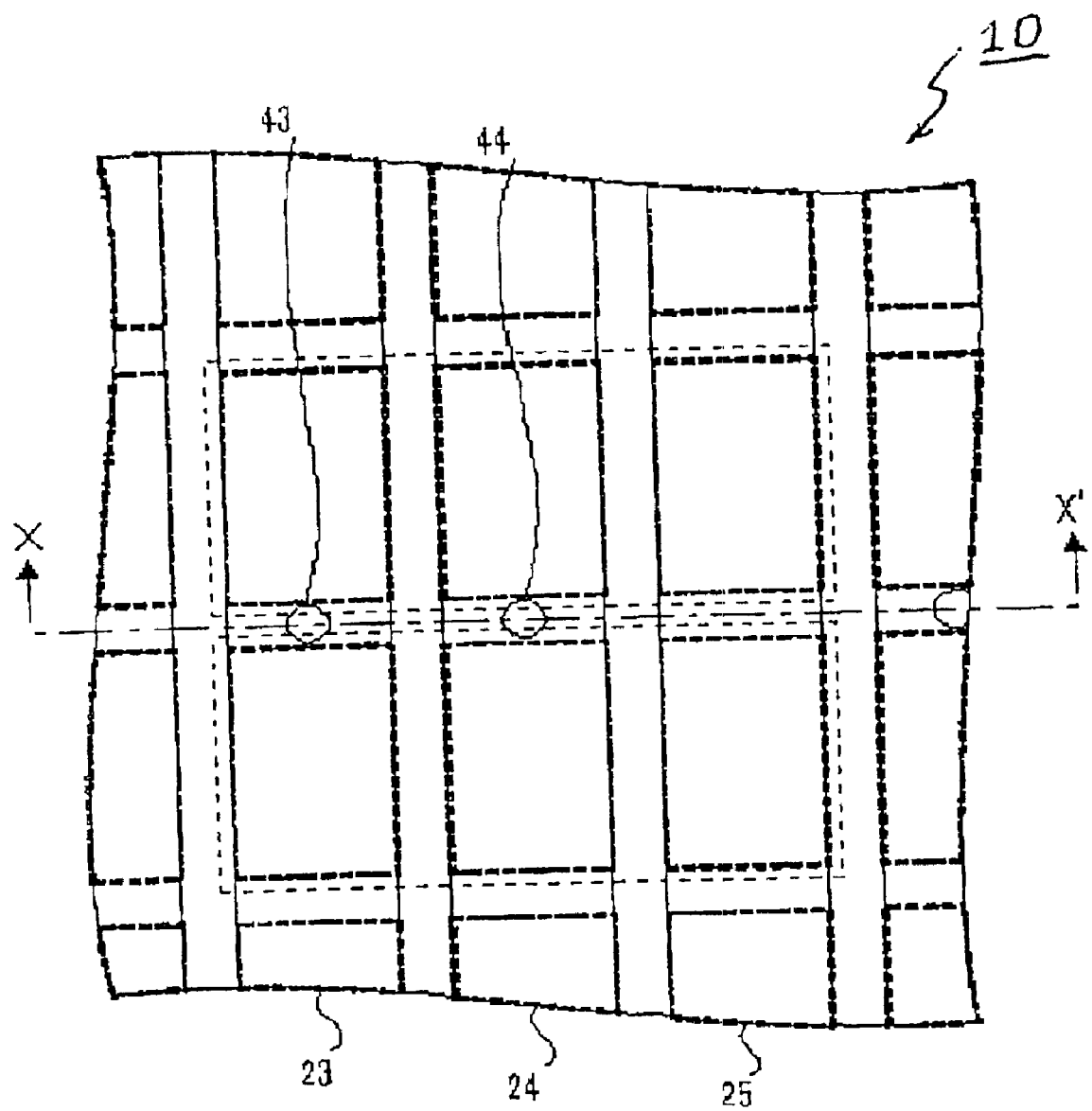
FIG. 9A is a fragmentary schematic plan view of a color filter substrate included in a novel liquid crystal display in a first embodiment in accordance with the present invention.
Figure 9B:
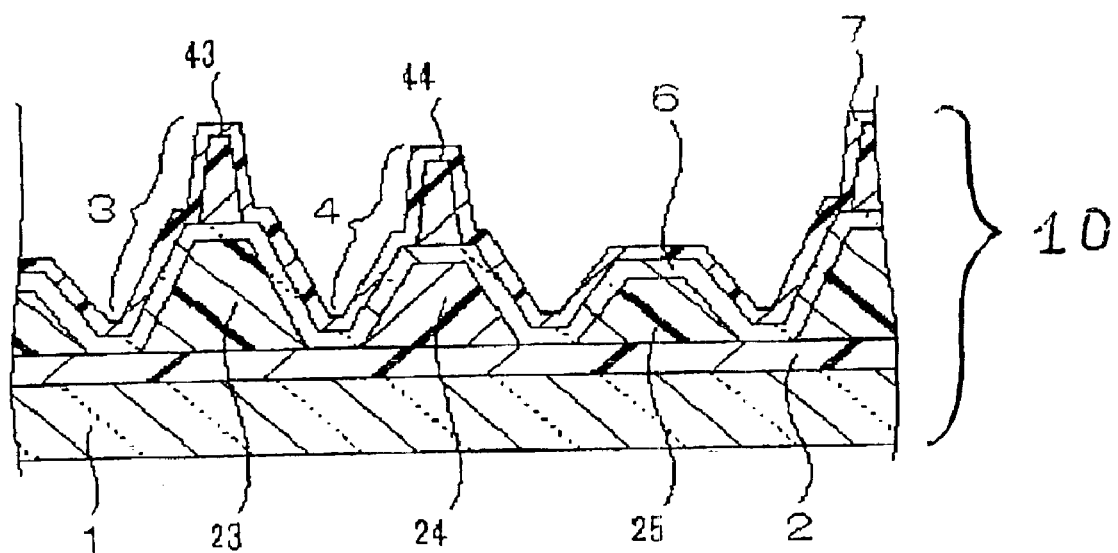
FIG. 9B is a fragmentary schematic cross sectional elevation view, taken along an X—X' line in FIG. 9A, illustrative of a novel spacer structure of the color filter substrate included in the novel liquid crystal display.

First Embodiment:

A first embodiment according to the present invention will be described in detail with reference to the drawings. FIG. 9A is a fragmentary schematic plan view of a color filter substrate included in a novel liquid crystal display in a first embodiment in accordance with the present invention. FIG. 9B is a fragmentary schematic cross sectional elevation view, taken along an X—X' line in FIG. 9A, illustrative of a novel spacer structure of the color filter substrate included in the novel liquid crystal display.

The color filter substrate 10 has a matrix array of pixels, each of which includes a set of primary-three-color filters 23, 24 and 25 which extend in parallel to each other and in a horizontal direction perpendicular to the X—X' line in FIG. 9A. The each pixel is represented by a broken line in FIG. 9A and has a rectangle shape in plan view which has a longitudinal direction along the X—X' line in FIG. 9A.

With reference to FIG. 9B, the color filter substrate 10 includes a glass substrate 1, a black matrix layer 2, first, second and third color filter layers 23, 24 and 25, a common electrode layer 6, first and second column-shaped spacers 43 and 44, and an orientation film 7. The black matrix layer 2 extends over the glass substrate 1. The black matrix layer 2 may comprise Cr or a resin.

The first, second and third color filter layers 23, 24 and 25 may be formed by a pigment-dispersion method. The first, second and third color filter layers 23, 24 and 25 correspond primary-three colors, for example, red, green and blue. The first, second and third color filter layers 23, 24 and 25 extend over the black matrix layer 2 in the horizontal direction perpendicular to the X—X' line. The first, second and third color filter layers 23, 24 and 25 are aligned in the direction along the X—X' line at a constant pitch and a constant gap, so that parts of the top surface of the black matrix layer 2 are exposed. Each of the first, second and third color filter layers 23, 24 and 25 has a ridge shape in sectioned view, so that each of the first, second and third color filter layers 23, 24 and 25 has a top plat surface and two sloped side-walls. The first, second and third color filter layers 23, 24 and 25 are, however, different in height, wherein the top levels of the first, second and third color filter layers 23, 24 and 25 are different from each other, but the bottom levels thereof are identical with each other. For example, the top level of the first color filter layer 23 is highest, while the top level of the third color filter layer 25 is lowest, and the top level of the second color filter layer 24 is middle between the first and third color filter layers 23 and 25. The differentiation in thickness or height among the first, second and third color filter layers 23, 24 and 25 need to adjust color-material concentrations of the first, second and third color filter layers 23, 24 and 25 in order to realize originally designed color tones.

The common electrode layer 6 extends on the respective top plat surface and the respective two sloped side-walls of the first, second and third color filter layers 23, 24 and 25 and also on the exposed surface of the black matrix layer 2. The common electrode layer 6 may typically comprise an indium tin oxide film.

The first and second column-shaped spacers 43 and 44 are provided in a gap between adjacent two of the pixels. The first and second column-shaped spacers 43 and 44 may optionally and advantageously comprise a photo-sensitive transparent acrylic resin. The first column-shaped spacer 43 is provided on the common electrode layer 6 over the top flat surface of the first color filter layer 23. The second column-shaped spacer 44 is provided on the common electrode layer 6 over the top flat surface of the second color filter layer 24. The first and second column-shaped spacers 43 and 44 have the same height as each other. However, the respective levels of the first and second column-shaped spacers 43 and 44 are different from each other, wherein the first column-shaped spacer 43 is higher in level than the second column-shaped spacer 44, because the respective levels of the first and second column-shaped spacers 43 and 44 depend on the respective top levels of the first and second color filter layers 23 and 24. Since the top level of the first color filter layer 23 is higher than the top level of the second color filter layer 24, then the first column-shaped spacer 43 is higher in level than the second column-shaped spacer 44, even though the respective heights of the first and second column-shaped spacers 43 and 44 are identical with each other.

A difference in level between the first and second column-shaped spacers 43 and 44 is caused by the difference in height of the first and second color filter layers 23 and 24. A first combination of the first color filter layer 23 and the first column-shaped spacer 43 forms a first spacer 3. A second combination of the second color filter layer 24 and the second column-shaped spacer 44 forms a second spacer 4. The first spacer 3 is greater in height than the second spacer 4. A difference in height between the first and second spacers 3 and 4 is caused by the difference in height of the first and second color filter layers 23 and 24.

The orientation film 7 extends on the top surface and the side walls of the first and second column-shaped spacers 43 and 44 as well as on the common electrode layer 6. The orientation film 7 is exposed to a liquid crystal layer.

Figure 10:
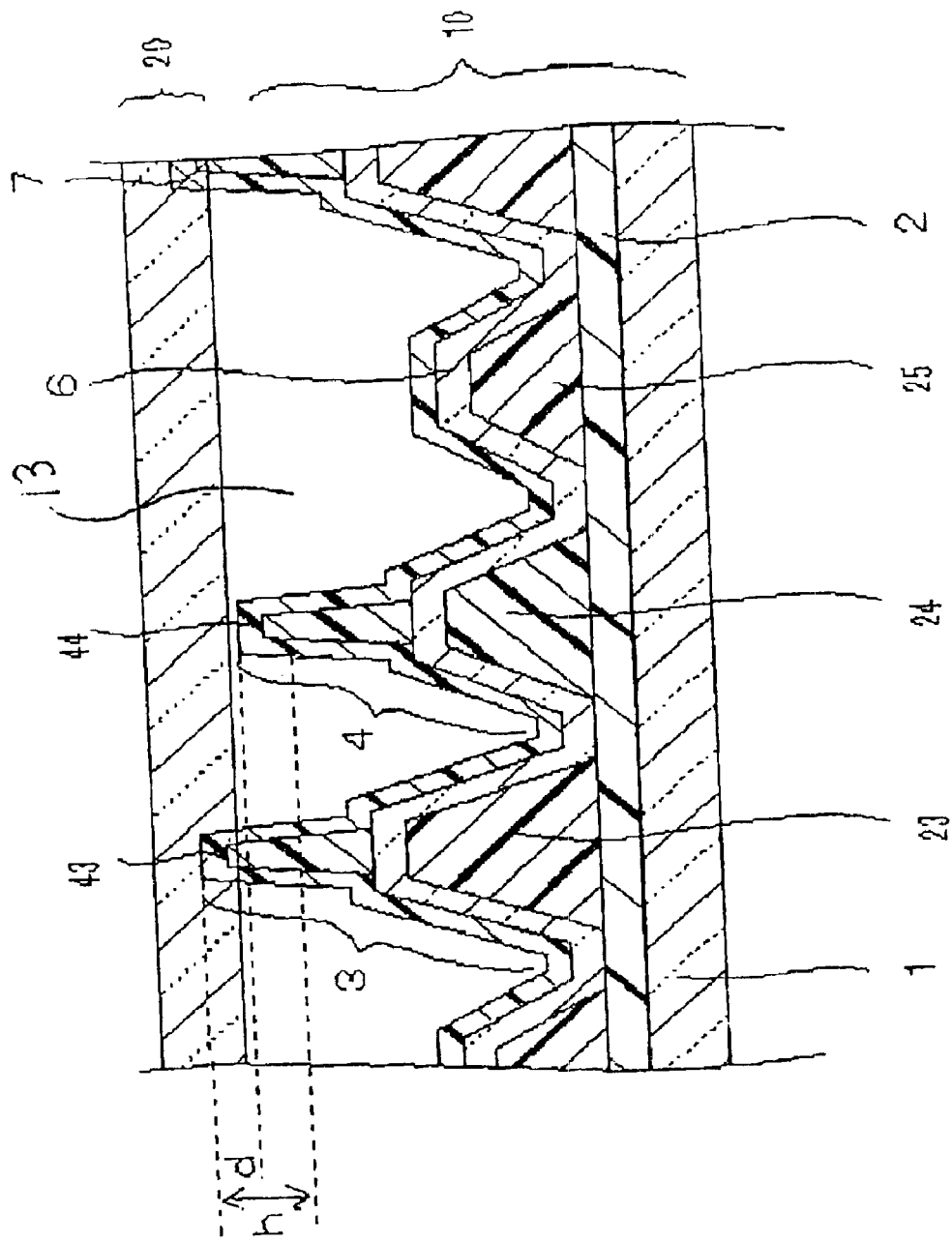
FIG. 10 is a fragmentary cross sectional elevation view of a novel liquid crystal display including a thin film transistor substrate and the color filter substrate of FIGS. 9A and 9B in the first embodiment in accordance with the present invention.

FIG. 10 is a fragmentary cross sectional elevation view of a novel liquid crystal display including a thin film transistor substrate and the color filter substrate of FIGS. 9A and 9B in the first embodiment in accordance with the present invention. The liquid crystal display includes the color filter substrate 10 as described with reference to FIGS. 9A and 9B and a thin film transistor substrate 20 as well as a liquid crystal layer 13 filling in an inter-space between the color filter substrate 10 and the thin film transistor substrate 20. The thin film transistor substrate 20 has a normal structure which includes a glass substrate, an insulating film, a matrix array of thin film transistors, interconnections and an orientation film which are not illustrated. The color filter substrate 10 is as described above with reference to FIGS. 9A and 9B.

As described above, the first column-shaped spacer 43 is higher in top level than the second column-shaped spacer 44, provided that the first and second column-shaped spacers 43 and 44 have the same height as each other, but the first color filter layer 23 has a larger height than the second color filter layer 23. When the thin film transistor substrate 20 receives an application of an external pressure or an external load in a vertical direction to the surface of the thin film transistor substrate 20, then the first column-shaped spacer 43 is first compressed by the applied load. In one typical example, the first and second column-shaped spacers 43 and 44 may be so designed as follows. In case that the cell gap is 4.0 micrometers, as the compressive deformation of the first spacer 3 becomes larger than 0.4 micrometers or one tenth of the cell gap of 4.0 micrometers, then the compressive deformation becomes plastic deformation from elastic deformation. Namely, if the compressive deformation of the first spacer 3 is smaller than one tenth of the cell gap, then the compressive deformation is elastic deformation, wherein after the device is released from the application of the external load, then the compressed first spacer 3 providing the reduced cell gap will be returned to the original shape providing the original cell gap. If the compressive deformation of the first spacer 3 is larger than one tenth of the cell gap, then the compressive deformation is plastic deformation, wherein even after the device is released from the application of the external load, then the compressed first spacer 3 providing the reduced cell gap will remain in the compressed or deformed state providing the reduced cell gap.

If a difference in level between the first and second column-shaped spacers 43 and 44 is defined to be "d", then the difference "d" is designed larger than a variation in cell gap between the normal temperature, for example, 20° C. and the low temperature, for example, −20° C., so that the elastic deformation of the first column-shaped spacer 43 completely absorbs the reduction in the cell gap caused by the temperature change from the normal temperature to the low temperature, whereby the first column-shaped spacer 43 shows no plastic deformation. Further, as the difference "d" is designed larger than a variation in cell gap between the normal temperature and the low temperature, the second column-shaped spacer 44 at the low temperature still remains distanced from the thin film transistor substrate 20 and thus the first column-shaped spacer 43 only remains mechanically supporting the thin film transistor substrate 20, whereby neither bubbles nor foam is formed in the liquid crystal layer 13 at the low temperature.

A distance "h" appearing in FIG. 10 represents a limitation of the elastic deformation of the first column-shaped spacer 43. If the compressive deformation of the first column-shaped spacer 43 becomes larger than the elastic deformation limit "h", then the deformation is the plastic deformation or the first column-shaped spacer 43 may be broken. A further mechanical support to the thin film transistor substrate 20 by the second spacer 4 is necessary for preventing the first column-shaped spacer 43 from showing the larger compressive deformation than the elastic deformation limit "h". Therefore, the difference "d" in the top level between the first and second spacers 3 and 4 is smaller than the elastic deformation limit "h" of the first column-shaped spacer 43.

It is, hereby, assumed that the cell gap corresponding to the first height of the first spacer 3 is 4.0 micrometers, and the elastic deformation limitation of the first column-shaped spacer 43 is 0.4 micrometers as one tenth of the cell gap. Namely, 0.4 micrometers is the transitional value from the elastic deformation to the plastic deformation. The second spacer 4 is deigned to have a second height which satisfies the condition that the difference "d" in the top level between the first and second spacers 3 and 4 is smaller than 0.4 micrometers of the elastic deformation limit "h" of the first column-shaped spacer 43. Namely, the second height is smaller than the first height of 4.0 micrometers of the first spacer 3, but larger than 3.6 micrometers which corresponds to the subtraction of the elastic deformation limit "h" from the first height of the first spacer 3.

Figure 11:
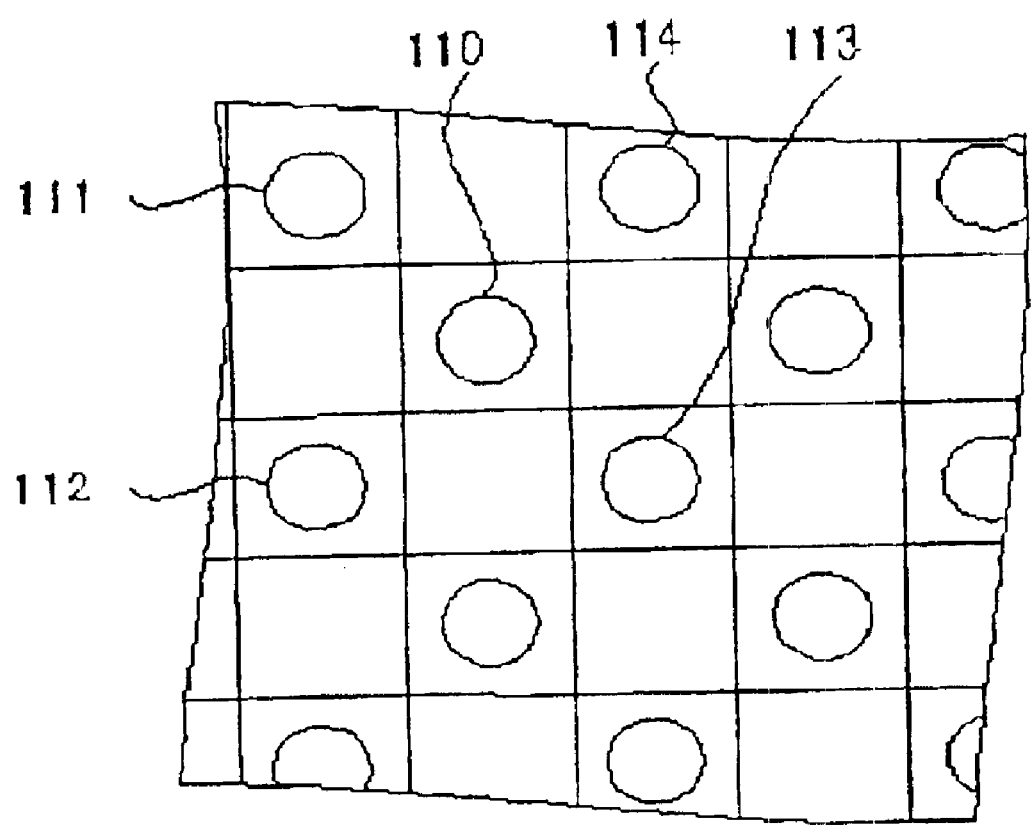
FIG. 11 is a fragmentary schematic plane view of one example of an arrangement pattern of spacers over a matrix array of pixels of the color filter substrate included in the liquid crystal display of FIG. 10.

FIG. 11 is a fragmentary schematic plane view of one example of an arrangement pattern of spacers over a matrix array of pixels of the color filter substrate included in the liquid crystal display of FIG. 10. Each squared block represents the pixel. Each circle represents the spacer. The spacers 3 and 4 are arranged in checkered pattern. In pixels 110, 111, 112, 113 and 114, the spacers are provided. The above arrangement pattern is only one example. It is also possible to provide a plurality of the column-shaped spacers over the color filters in the single pixel. It is also possible to vary the density in arrangement of the spacers.

Adjustment in the area of the top of the column-shaped spacers provides substantially the same effect as adjustment to the density in arrangement of the column-shaped spacers. In this embodiment, the arrangement of the spacers is made by taking into account only the spacer arrangement density.

The above embodiment of the present invention may realize that the design of the spacers be made to avoid the gap variation at the high temperature condition and also the formation of bubbles or foam in the low temperature condition, and also to provide a sufficient mechanical supporting strength to the external load. Namely, the difference in top level of the spacers allows that the first spacer only absorbs the compressive deformation of the cell as long as the compressive deformation of the first column-shaped spacer is in the elastic deformation, while as the compressive deformation of the first column-shaped spacer reaches the elastic deformation limit, then the second spacer also absorbs the compressive deformation of the cell in addition to the first spacer. After the cell is released from the external load, then only the first spacer mechanically supports the thin film transistor substrate. This structure may allow a reduction of the cell gap, thereby making it difficult to form bubbles or foam.

For numerical comparison of the withstand load strength of the liquid crystal cell, it is assumed that the withstand load strength is 1.0 if the spacers are provided in all of the pixels. If the spacers are provided in one half of all the pixels, then the withstand load strength is approximately 0.5.

Under the low temperature condition, a half arrangement of the spacers in one half of all the pixels allows a larger compression or a larger reduction in the cell gap than a full arrangement of the spacers in all the pixels, for which reason the half arrangement of the spacers in one half of all the pixels is suitable for avoiding the undesired formation of bubbles and foam in the liquid crystal layer, and thus avoiding the display defect.

If the above described novel liquid crystal display needs substantially the same withstand load strength of the spacers as of the conventional display with the full spacer arrangement, and if the above described novel liquid crystal display needs substantially the same display defective rate as of the conventional display with the half spacer arrangement, then this display may be realized by arrangement of a pair of the first and second spacers in each pixel.

Figure 12A:
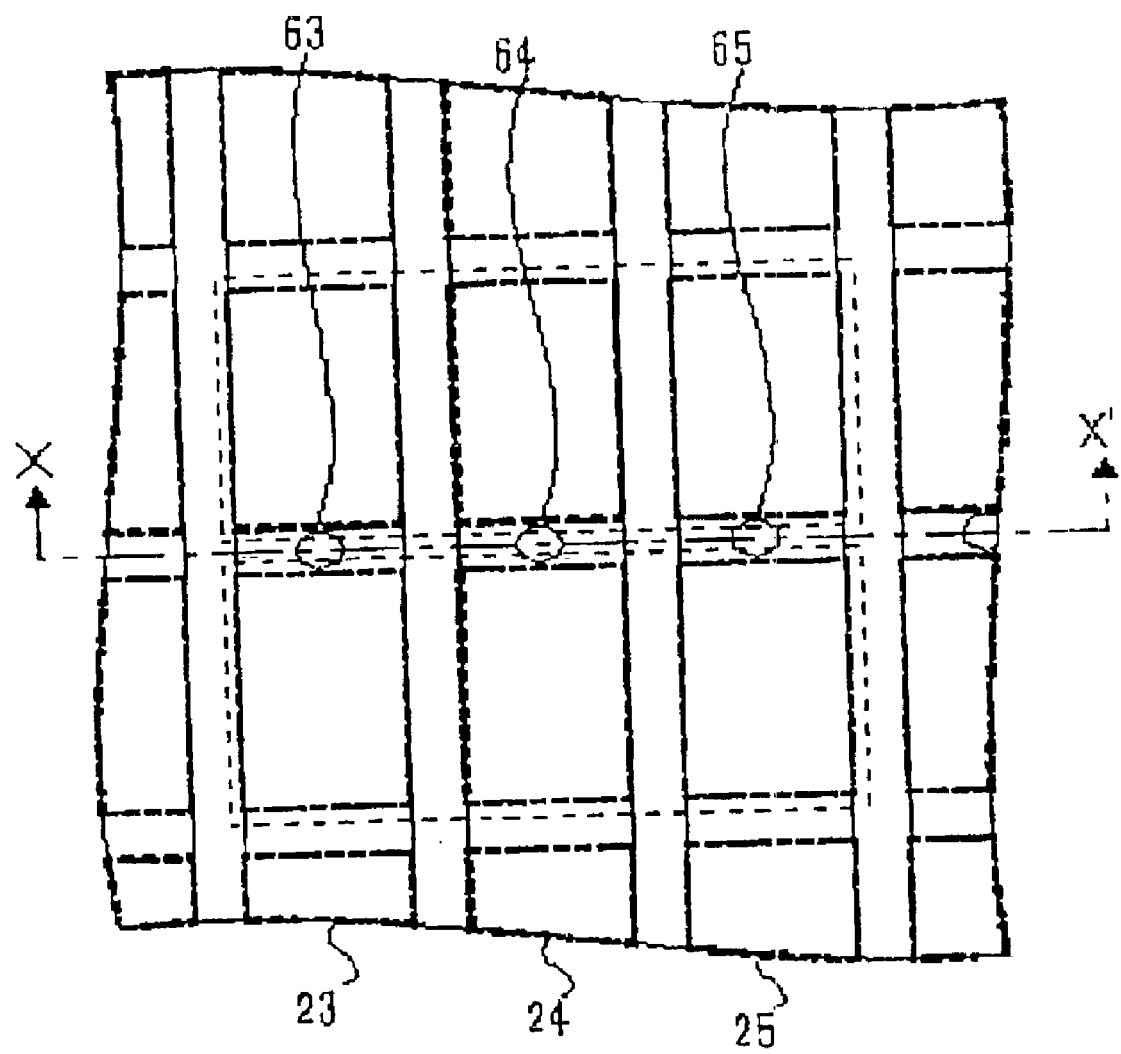
FIG. 12A is a fragmentary schematic plan view of a color filter substrate included in a novel liquid crystal display in a modified embodiment in accordance with the present invention.
Figure 12B:
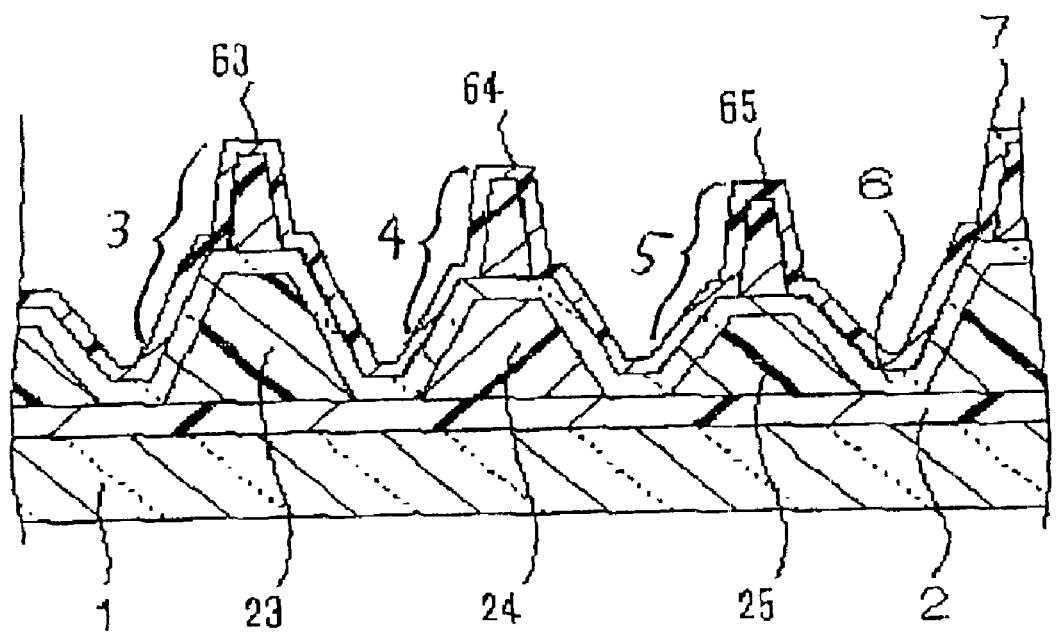
FIG. 12B is a fragmentary schematic cross sectional elevation view, taken along an X—X' line in FIG. 12A, illustrative of a novel spacer structure of the color filter substrate included in the novel liquid crystal display.

As a modification to the above embodiment, first, second and third column-shaped spacers having the same height are provided over the first, second and third color filter layers having different heights, respectively. FIG. 12A is a fragmentary schematic plan view of a color filter substrate included in a novel liquid crystal display in a modified embodiment in accordance with the present invention. FIG. 12B is a fragmentary schematic cross sectional elevation view, taken along an X—X' line in FIG. 12A, illustrative of a novel spacer structure of the color filter substrate included in the novel liquid crystal display.

The color filter substrate 10 has a matrix array of pixels, each of which includes a set of primary-three-color filters 23, 24 and 25 which extend in parallel to each other and in a horizontal direction perpendicular to the X—X' line in FIG. 12A. The each pixel is represented by a broken line in FIG. 12A and has a rectangle shape in plan view which has a longitudinal direction along the X—X' line in FIG. 12A.

With reference to FIG. 12B, the color filter substrate 10 includes a glass substrate 1, a black matrix layer 2, first, second and third color filter layers 23, 24 and 25, a common electrode layer 6, first, second and third column-shaped spacers 63, 64 and 65, and an orientation film 7.

The first, second and third color filter layers 23, 24 and 25 may be formed by a pigment-dispersion method. The first, second and third color filter layers 23, 24 and 25 correspond primary-three colors, for example, red, green and blue. The first, second and third color filter layers 23, 24 and 25 extend over the black matrix layer 2 in the horizontal direction perpendicular to the X—X' line. The first, second and third color filter layers 23, 24 and 25 are aligned in the direction along the X—X' line at a constant pitch and a constant gap, so that parts of the top surface of the black matrix layer 2 are exposed. Each of the first, second and third color filter layers 23, 24 and 25 has a ridge shape in sectioned view, so that each of the first, second and third color filter layers 23, 24 and 25 has a top plat surface and two sloped side-walls. The first, second and third color filter layers 23, 24 and 25 are, however, different in height, wherein the top levels of the first, second and third color filter layers 23, 24 and 25 are different from each other, but the bottom levels thereof are identical with each other. For example, the top level of the first color filter layer 23 is highest, while the top level of the third color filter layer 25 is lowest, and the top level of the second color filter layer 24 is middle between the first and third color filter layers 23 and 25. The differentiation in thickness or height among the first, second and third color filter layers 23, 24 and 25 need to adjust color-material concentrations of the first, second and third color filter layers 23, 24 and 25 in order to realize originally designed color tones.

The common electrode layer 6 extends on the respective top flat surface and the respective two sloped side-walls of the first, second and third color filter layers 23, 24 and 25 and also on the exposed surface of the black matrix layer 2. The common electrode layer 6 may typically comprise an indium tin oxide film.

The first, second and third column-shaped spacers 63, 64 and 65 are provided in a gap between adjacent two of the pixels. The first, second and third column-shaped spacers 63, 64 and 65 may optionally and advantageously comprise a photo-sensitive transparent acrylic resin. The first column-shaped spacer 63 is provided on the common electrode layer 6 over the top plat surface of the first color filter layer 23. The second column-shaped spacer 64 is provided on the common electrode layer 6 over the top plat surface of the second color filter layer 24. The third column-shaped spacer 65 is provided on the common electrode layer 6 over the top plat surface of the third color filter layer 25. The first, second and third column-shaped spacers 63, 64 and 65 have the same height as each other. However, the respective levels of the first, second and third column-shaped spacers 63, 64 and 65 are different from each other, wherein the first column-shaped spacer 63 is higher in level than the second column-shaped spacer 64 which is higher in level than the third column-shaped spacer 65, because the respective levels of the first, second and third column-shaped spacers 63, 64 and 65 depend on the respective top levels of the first, second and third color filter layers 23, 24 and 25. Since the top level of the first color filter layer 23 is higher than the top level of the second color filter layer 24, then the first column-shaped spacer 63 is higher in level than the second column-shaped spacer 64, even the respective heights of the first and second column-shaped spacers 63 and 64 are identical with each other. Since the top level of the second color filter layer 24 is higher than the top level of the third color filter layer 25, then the second column-shaped spacer 64 is higher in level than the third column-shaped spacer 65, even the respective heights of the second and third column-shaped spacers 64 and 65 are identical with each other.

Respective differences in level among the first, second and third column-shaped spacers 63, 64 and 65 are caused by the differences in height of the first, second and third color filter layers 23, 24 and 25. A first combination of the first color filter layer 23 and the first column-shaped spacer 63 forms a first spacer 3. A second combination of the second color filter layer 24 and the second column-shaped spacer 64 forms a second spacer 4. A third combination of the third color filter layer 25 and the third column-shaped spacer 65 forms a third spacer 5. The first spacer 3 is greater in height than the second spacer 4. A difference in height between the first and second spacers 3 and 4 is caused by the difference in height of the first and second color filter layers 23 and 24. The second spacer 4 is greater in height than the third spacer 5. A difference in height between the second and third spacers 4 and 5 is caused by the difference in height of the second and third color filter layers 24 and 25.

The above modified spacer structure also provide substantially the same functions and effects as described in the first embodiment.

Figure 13A:
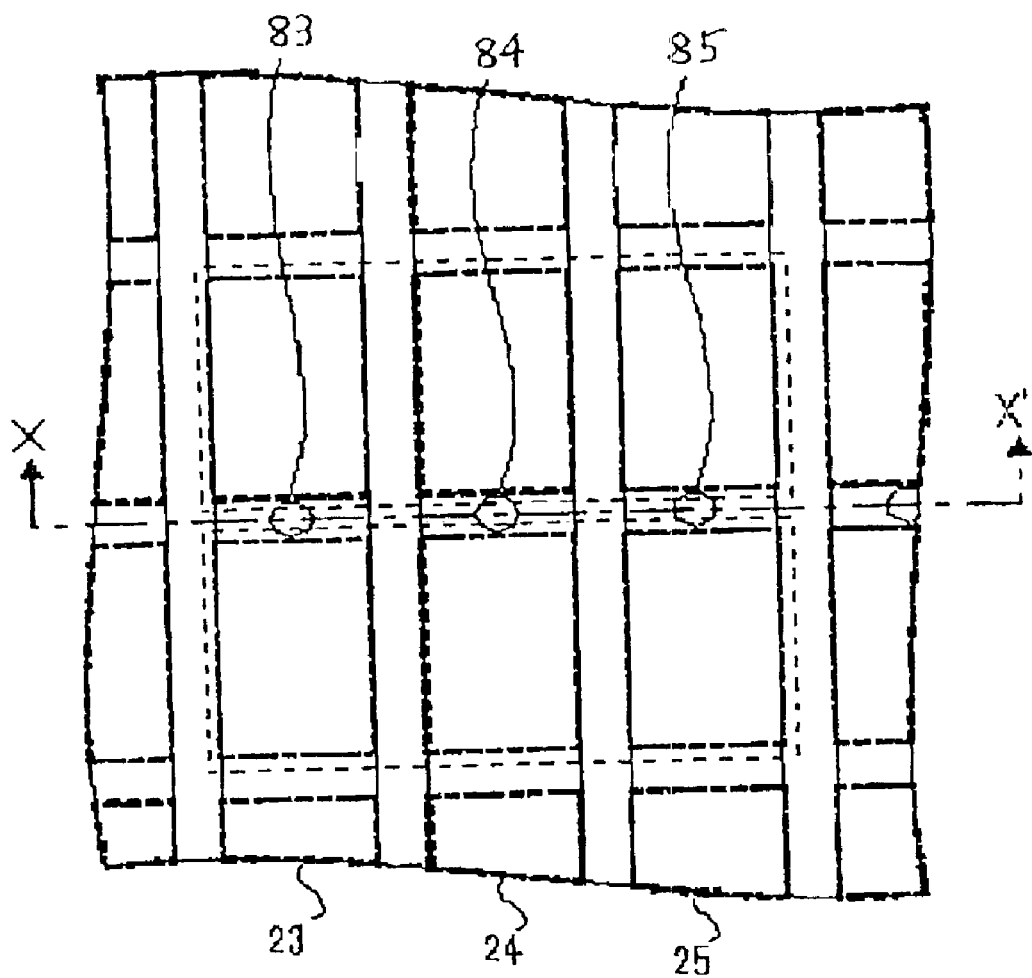
FIG. 13A is a fragmentary schematic plan view of a color filter substrate included in a novel liquid crystal display in a further modified embodiment in accordance with the present invention.
Figure 13B:
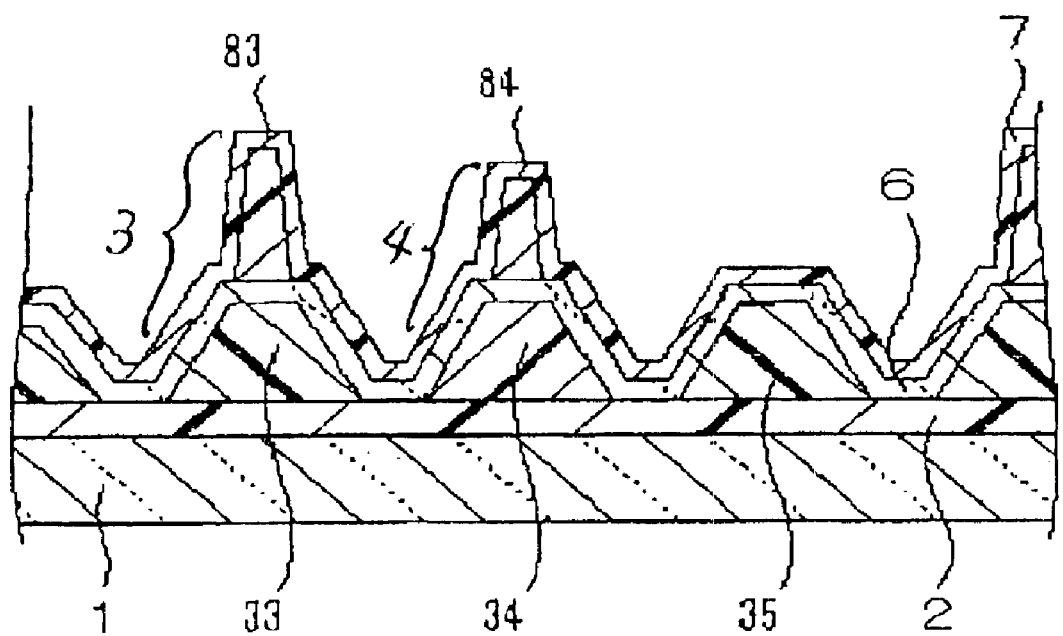
FIG. 13B is a fragmentary schematic cross sectional elevation view, taken along an X—X' line in FIG. 13A, illustrative of a novel spacer structure of the color filter substrate included in the novel liquid crystal display.

As a further modification to the above embodiment, first, second and third column-shaped spacers having the same height are provided over the first, second and third color filter layers having different heights, respectively. FIG. 13A is a fragmentary schematic plan view of a color filter substrate included in a novel liquid crystal display in a further modified embodiment in accordance with the present invention. FIG. 13B is a fragmentary schematic cross sectional elevation view, taken along an X—X' line in FIG. 13A, illustrative of a novel spacer structure of the color filter substrate included in the novel liquid crystal display.

The color filter substrate 10 has a matrix array of pixels, each of which includes a set of primary-three-color filters 23, 24 and 25 which extend in parallel to each other and in a horizontal direction perpendicular to the X—X' line in FIG. 13A. The each pixel is represented by a broken line in FIG. 13A and has a rectangle shape in plan view which has a longitudinal direction along the X—X' line in FIG. 13A.

With reference to FIG. 13B, the color filter substrate 10 includes a glass substrate 1, a black matrix layer 2, first, second and third color filter layers 23, 24 and 25, a common electrode layer 6, first and second column-shaped spacers 83 and 84, and an orientation film 7.

The first, second and third color filter layers 23, 24 and 25 may be formed by a pigment-dispersion method. The first, second and third color filter layers 23, 24 and 25 correspond primary-three colors, for example, red, green and blue. The first, second and third color filter layers 23, 24 and 25 extend over the black matrix layer 2 in the horizontal direction perpendicular to the X—X' line. The first, second and third color filter layers 23, 24 and 25 are aligned in the direction along the X—X' line at a constant pitch and a constant gap, so that parts of the top surface of the black matrix layer 2 are exposed. Each of the first, second and third color filter layers 23, 24 and 25 has a ridge shape in sectioned view, so that each of the first, second and third color filter layers 23, 24 and 25 has a top plat surface and two sloped side-walls. The first, second and third color filter layers 23, 24 and 25 have a uniform height.

The common electrode layer 6 extends on the respective top plat surface and the respective two sloped side-walls of the first, second and third color filter layers 23, 24 and 25 and also on the exposed surface of the black matrix layer 2. The common electrode layer 6 may typically comprise an indium tin oxide film.

The first and second column-shaped spacers 83 and 84 are provided in a gap between adjacent two of the pixels. The first and second column-shaped spacers 83 and 84 may optionally and advantageously comprise a photo-sensitive transparent acrylic resin. The first column-shaped spacer 83 is provided on the common electrode layer 6 over the top plat surface of the first color filter layer 23. The second column-shaped spacer 84 is provided on the common electrode layer 6 over the top plat surface of the second color filter layer 24. The first and second column-shaped spacers 83 and 84 are different in height from each other, wherein the first column-shaped spacer 83 is higher than the second column-shaped spacer 83, so that the respective top levels of the first and second column-shaped spacers 83 and 84 are different from each other, wherein the first column-shaped spacer 83 is higher in top level than the second column-shaped spacer 84.

A difference in top level between the first and second column-shaped spacers 83 and 84 is caused by the difference in height thereof. A first combination of the first color filter layer 23 and the first column-shaped spacer 83 forms a first spacer 3. A second combination of the second color filter layer 24 and the second column-shaped spacer 84 forms a second spacer 4. The first spacer 3 is greater in height than the second spacer 4. A difference in height between the first and second spacers 3 and 4 is caused by the difference in height of the first and second color filter layers 23 and 24.

The above modified spacer structure also provide substantially the same functions and effects as described in the first embodiment.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A liquid crystal display cell including:
   a first substrate;
   a second substrate;
   a liquid crystal layer interposed between said first and second substrates; and
   a spacer structure on said second substrate, and said spacer structure further including:
   at least a first type spacer having a first height; and
   at least a second type spacer having a second height which is smaller than said first height,
   wherein said first type spacer comprises a first color filter layer over said second substrate, and a first column-shaped spacer over said first color filter layer, and said second type spacer comprises a second color filter layer over said second substrate, and a second column-shaped spacer over said second color filter layer,
   wherein said first and second color filter layers have the same thickness or height, while said first column-shaped spacer is larger in height than said second column-shaped spacer.

2. The liquid crystal display cell as claimed in claim 1, wherein said first height provides an original cell gap, and a difference between said first and second heights is smaller than an elastic deformation limit of said first spacer, provided that said elastic deformation limit is a transitional compressive deformation amount, over which a compressive deformation is a plastic deformation and under which said compressive deformation is an elastic deformation.

3. The liquid crystal display cell as claimed in claim 1, wherein said first height provides an original cell gap, and said second height is larger than a subtraction of an elastic deformation limit of said first spacer from said first height, provided that said elastic deformation limit is a transitional compressive deformation amount, over which a compressive deformation is a plastic deformation and under which said compressive deformation is an elastic deformation.

4. A liquid crystal display cell including:
   a first substrate;
   a second substrate;
   a liquid crystal layer interposed between said first and second substrates; and
   a spacer structure on said second substrate, and said spacer structure further including:
   at least a first type spacer having a first height; and
   at least a second type spacer having a second height which is smaller than said first height,
   wherein said first type spacer comprises a first color filter layer over said second substrate, and a first column-shaped spacer over said first color filter layer, and said second type spacer comprises a second color filter layer over said second substrate, and a second column-shaped spacer over said second color filter layer,
   wherein said first and second column-shaped spacers have the same height, while said first color filter layer is larger in thickness or height than said second color filter layer.

5. The liquid crystal display cell as claimed in claim 4, wherein said first height provides an original cell gap, and a difference between said first and second heights is smaller than an elastic deformation limit of said first spacer, provided that said elastic deformation limit is a transitional compressive deformation amount, over which a compressive deformation is a plastic deformation and under which said compressive deformation is an elastic deformation.

6. The liquid crystal display cell as claimed in claim 4, wherein said first height provides an original cell gap, and said second height is larger than a subtraction of an elastic deformation limit of said first spacer from said first height, provided that said elastic deformation limit is a transitional compressive deformation amount, over which a compressive deformation is a plastic deformation and under which said compressive deformation is an elastic deformation.

7. A liquid crystal display cell including:
   a first substrate;
   a second substrate;
   a liquid crystal layer interposed between said first and second substrates; and
   a spacer structure on said second substrate, and said spacer structure further including:
   at least a first type spacer having a first height;
   at least a second type spacer having a second height which is smaller than said first height; and
   at least a third type spacer having a third height which is smaller than said second height.

8. The liquid crystal display cell as claimed in claim 7, wherein said first type spacer comprises a first color filter layer over said second substrate, and a first column-shaped spacer over said first color filter layer, and said second type spacer comprises a second color filter layer over said second substrate, and a second column-shaped spacer over said second color filter layer.

9. The liquid crystal display cell as claimed in claim 7, wherein said third type spacer comprises a third color filter layer over said second substrate, and a third column-shaped spacer over said third color filter layer.

10. The liquid crystal display cell as claimed in claim 9, wherein said first, second and third color filter layers have the same thickness or height, while said first column-shaped spacer is larger in height than said second column-shaped spacer, and said second column-shaped spacer is larger in height than said third column-shaped spacer.

11. The liquid crystal display cell as claimed in claim 9, wherein said first, second and third column-shaped spacers have the same height, while said first color filter layer is larger in height than said second color filter layer, and said second color filter layer is larger in thickness or height than said third color filter layer.

12. A spacer structure over a substrate for a liquid crystal display cell, said spacer structure including:

at least a first type spacer having a first height; and at least a second type spacer having a second height which is smaller than said first height, wherein said first type spacer comprises a first color filter layer over said second substrate, and a first column-shaped spacer over said first color filter layer, and said second type spacer comprises a second color filter layer over said second substrate, and a second column-shaped spacer over said second color filter layer, wherein said first and second color filter layers have the same thickness or height, while said first column-shaped spacer is larger in height than said second column-shaped spacer.

13. The spacer structure as claimed in claim 12, wherein said first height provides an original cell gap, and a difference between said first and second heights is smaller than an elastic deformation limit of said first spacer, provided that said elastic deformation limit is a transitional compressive deformation amount, over which a compressive deformation is a plastic deformation and under which said compressive deformation is an elastic deformation.

14. The spacer structure as claimed in claim 12, wherein said first height provides an original cell gap, and said second height is larger than a subtraction of an elastic deformation limit of said first spacer from said first height, provided that said elastic deformation limit is a transitional compressive deformation amount, over which a compressive deformation is a plastic deformation and under which said compressive deformation is an elastic deformation.

15. A spacer structure over a substrate for a liquid crystal display cell, said spacer structure including:

at least a first type spacer having a first height; and at least a second type spacer having a second height which is smaller than said first height, wherein said first type spacer comprises a first color filter layer over said second substrate, and a first column-shaped spacer over said first color filter layer, and said second type spacer comprises a second color filter layer over said second substrate, and a second column-shaped spacer over said second color filter layer, wherein said first and second column-shaped spacers have the same height, while said first color filter layer is larger in thickness or height than said second color filter layer.

16. The spacer structure as claimed in claim 15, wherein said first height provides an original cell gap, and a difference between said first and second heights is smaller than an elastic deformation limit of said first spacer, provided that said elastic deformation limit is a transitional compressive deformation amount, over which a compressive deformation is a plastic deformation and under which said compressive deformation is an elastic deformation.

17. The spacer structure as claimed in claim 15, wherein said first height provides an original cell gap, and second height is larger than a subtraction of an elastic deformation limit of said first spacer from said first height, provided that said elastic deformation limit is a transitional compressive deformation amount, over which a compressive deformation is a plastic deformation and under which said compressive deformation is an elastic deformation.

18. A spacer structure over a substrate for a liquid crystal display cell, said spacer structure including:

at least a first type spacer having a first height;

at least a second type spacer having a second height which is smaller than said first height; and at least a third type spacer having a third height which is smaller than said second height.

19. The spacer structure as claimed in claim 18, wherein said first type spacer comprises a first color filter layer over said second substrate, and a first column-shaped spacer over said first color filter layer, and said second type spacer comprises a second color filter layer over said second substrate, and a second column-shaped spacer over said second color filter layer.

20. The spacer structure as claimed in claim 18, wherein said third type spacer comprises a third color filter layer over said second substrate, and a third column-shaped spacer over said third color filter layer.

21. The spacer structure as claimed in claim 20, wherein said first, second and third color filter layers have the same thickness or height, while said first column-shaped spacer is larger in height than said second column-shaped spacer, and said second column-shaped spacer is larger in height than said third column-shaped spacer.

22. The spacer structure as claimed in claim 20, wherein said first, second and third column-shaped spacers have the same height, while said first color filter layer is larger in height than said second color filter layer, and said second color filter layer is larger in thickness or height than said third color filter layer.

* * * * *